(12) United States Patent
Kumar et al.

(10) Patent No.: US 7,189,376 B2
(45) Date of Patent: Mar. 13, 2007

(54) MULTI-ZONED CATALYST AND TRAP

(75) Inventors: Sanath V. Kumar, North Brunswick, NJ (US); Harold N. Rabinowitz, Upper Montclair, NJ (US)

(73) Assignee: Engelhard Corporation, Iselin, NJ (US)

( * ) Notice: Subject to any disclaimer, the term of this patent is extended or adjusted under 35 U.S.C. 154(b) by 869 days.

(21) Appl. No.: 10/366,096

(22) Filed: Feb. 13, 2003

(65) Prior Publication Data

US 2004/0001782 A1 Jan. 1, 2004

Related U.S. Application Data

(63) Continuation-in-part of application No. 10/183,863, filed on Jun. 27, 2002.

(51) Int. Cl.
*B01D 50/00* (2006.01)
(52) U.S. Cl. .................. 422/177; 422/171; 422/180
(58) Field of Classification Search ............... 422/171, 422/177, 180
See application file for complete search history.

(56) References Cited

U.S. PATENT DOCUMENTS 4,134,860 A 1/1979 Hindin et al. ............... 252/466
4,189,404 A 2/1980 Keith et al. ................. 252/462
4,587,231 A * 5/1986 Sawamura et al. ......... 502/304

(Continued)

FOREIGN PATENT DOCUMENTS

WO WO 92/09848 6/1992

(Continued)

OTHER PUBLICATIONS

Numerical Approach for Improving the Conversion Characteristics of Exhaust Catalysts Under Warming-Up Condition; Society of Automotive Engineers 962076. Baba, et al. (1996) 141-156.

(Continued)

*Primary Examiner*—Glenn Caldarola
*Assistant Examiner*—Tom P. Duong
(74) *Attorney, Agent, or Firm*—Richard A. Negin

(57) ABSTRACT

Provided are coated, multi-zoned catalyst substrates that trap and combust hydrocarbon and nitrogen oxides pollutants in a single monolith substrate. In some embodiments, the multi-zoned catalysts contain both radial and axial zones. The zones can be formed by deposition of segregated coating compositions (or washcoats) containing platinum group metals and pollutant adsorbent materials to form layers along the length and radius of the honeycomb substrate. The invention also relates to exhaust gas treating systems that incorporate the multi-zoned catalysts.

92 Claims, 12 Drawing Sheets

U.S. PATENT DOCUMENTS

| | | | |
|---|---|---|---|
| 4,609,563 A | 9/1986 | Shimrock et al. | 427/8 |
| 4,714,694 A | 12/1987 | Wan et al. | 502/304 |
| 5,010,051 A | 4/1991 | Rudy | 502/304 |
| 5,057,483 A * | 10/1991 | Wan | 502/304 |
| 5,510,086 A | 4/1996 | Hemingway et al. | 422/171 |
| 5,597,771 A | 1/1997 | Hu et al. | 502/304 |
| 5,676,912 A | 10/1997 | Sharma et al. | 423/213.2 |
| 5,792,436 A | 8/1998 | Feeley et al. | 423/210 |
| 5,953,832 A | 9/1999 | Rosynsky et al. | 34/403 |
| 6,044,644 A | 4/2000 | Hu et al. | 60/302 |
| 6,074,973 A | 6/2000 | Lampert et al. | 502/60 |
| 6,087,298 A * | 7/2000 | Sung et al. | 502/333 |
| 6,105,365 A | 8/2000 | Deeba et al. | 60/274 |
| 6,171,556 B1 | 1/2001 | Burk et al. | 422/173 |
| 6,296,813 B1 * | 10/2001 | Ishii et al. | 422/171 |
| 2001/0006934 A1 | 7/2001 | Kachi et al | 502/325 |
| 2002/0022574 A1 | 2/2002 | Tanada et al. | 502/527.12 |

FOREIGN PATENT DOCUMENTS

| | | |
|---|---|---|
| WO | WO 95/35152 | 12/1995 |
| WO | WO 99/47260 | 9/1999 |
| WO | WO 99/55459 | 11/1999 |
| WO | WO 01/12320 A1 | 2/2001 |

OTHER PUBLICATIONS

U.S. Appl. No. 09/067,820, filed Apr. 28, 1998, Dettling et al, not provided, cumulative with WO99/55459 (below).

* cited by examiner

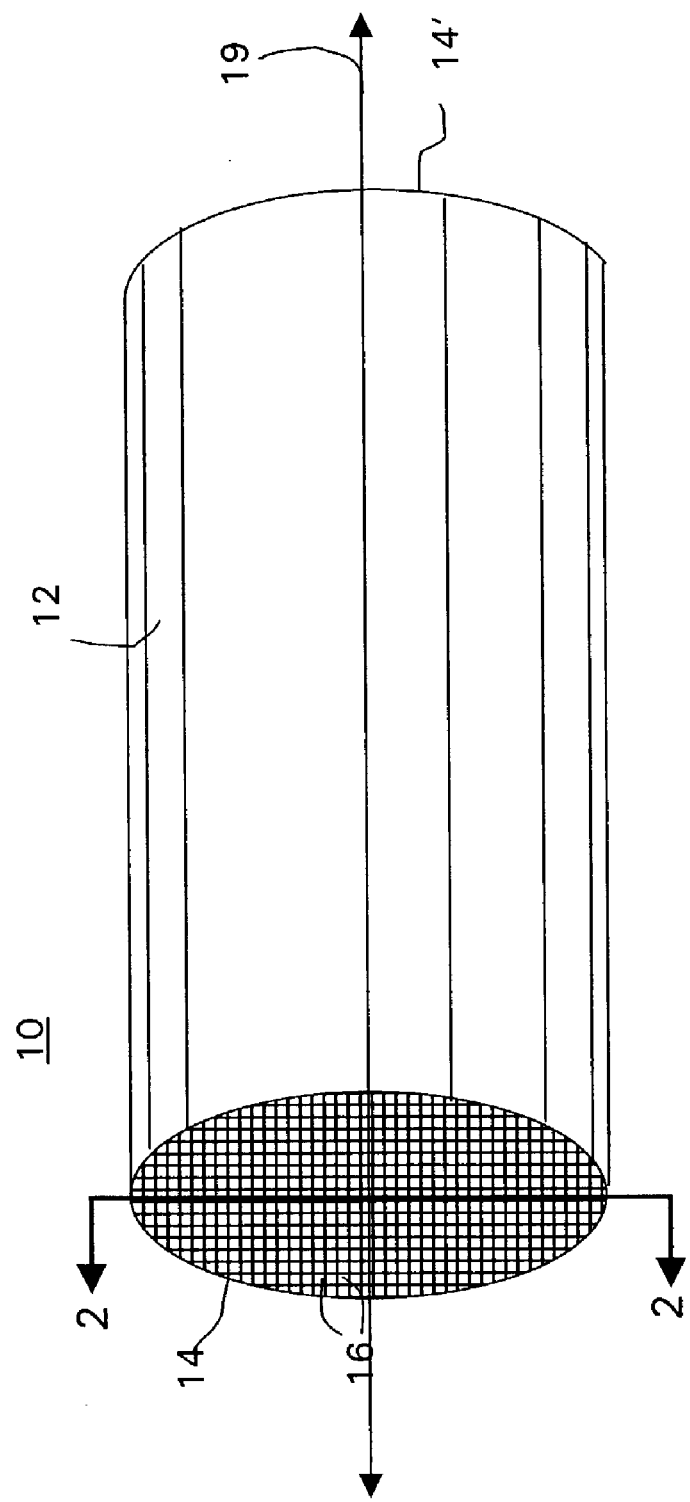

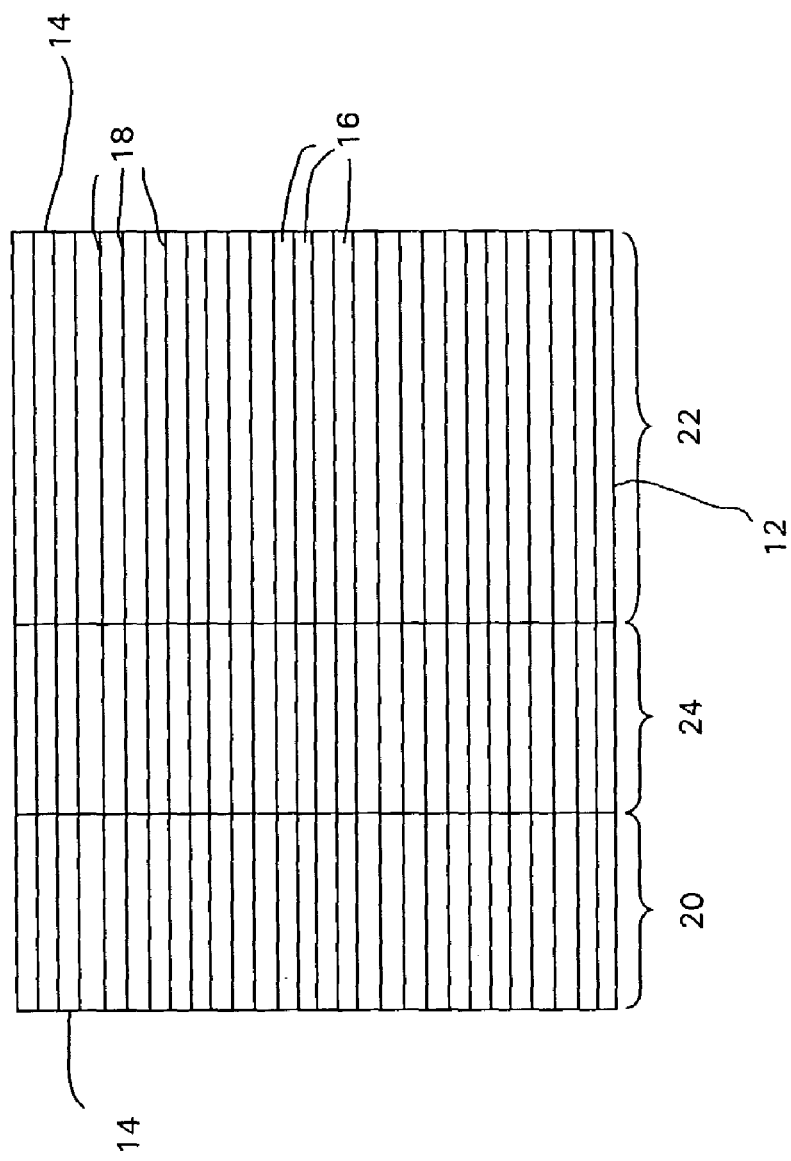

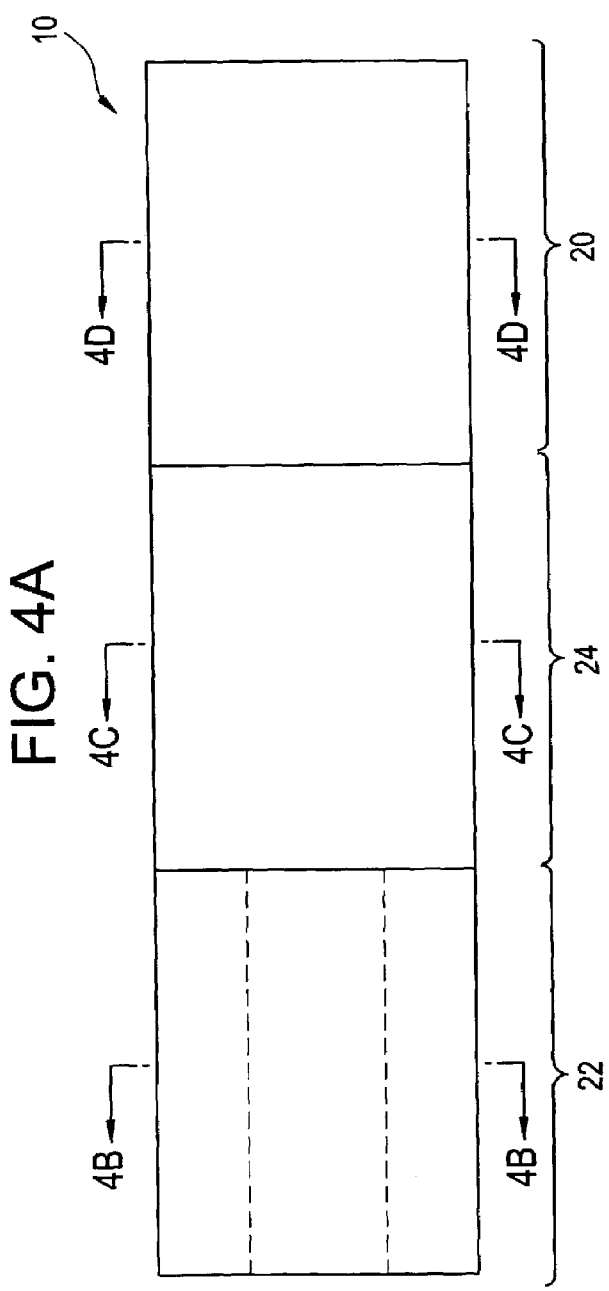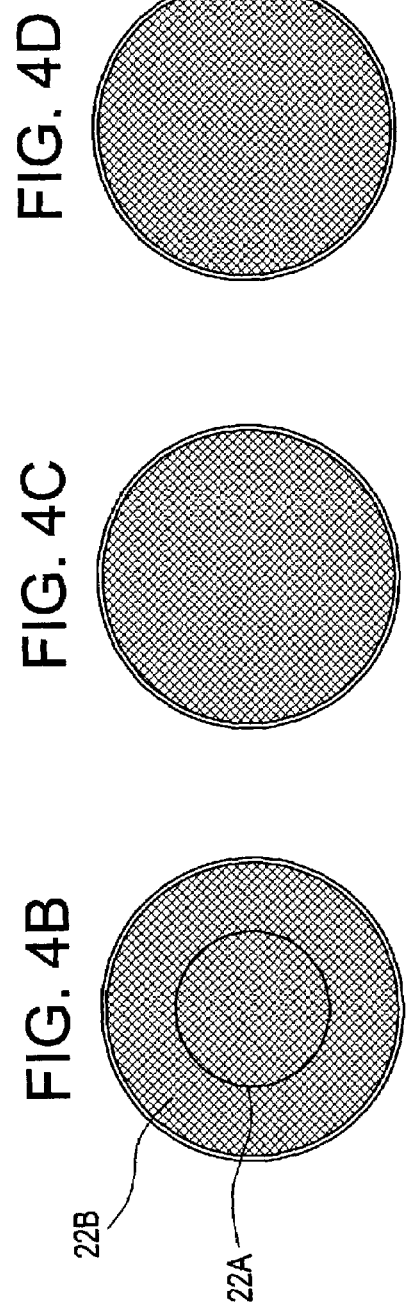

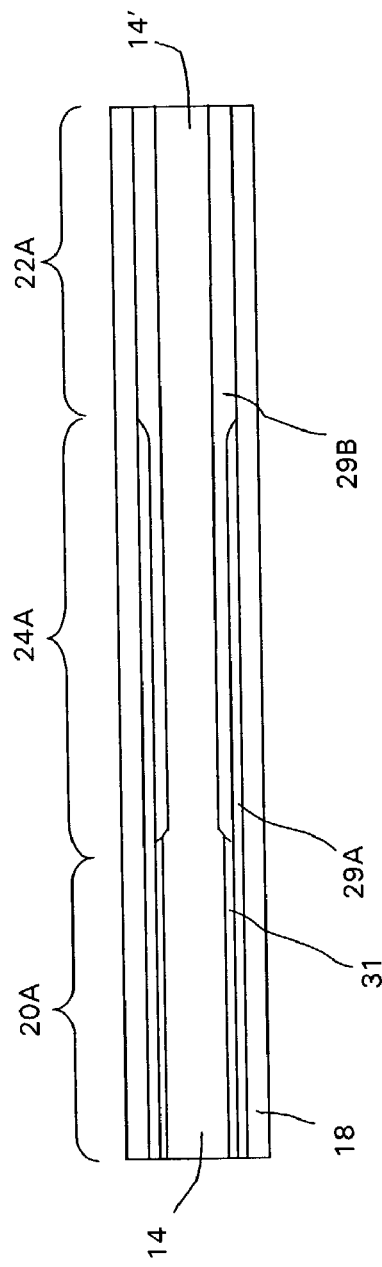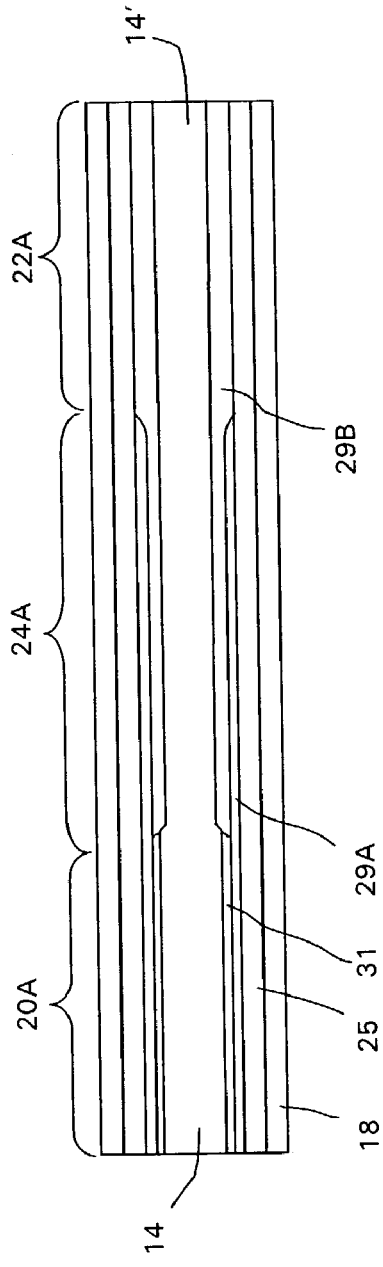

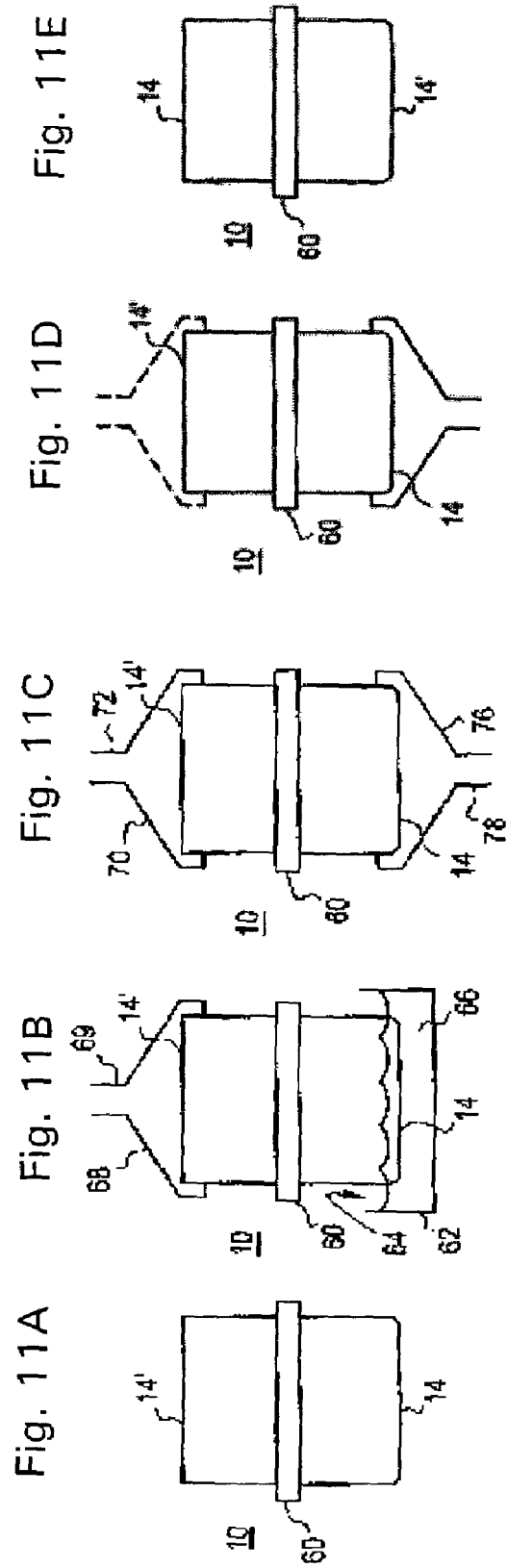

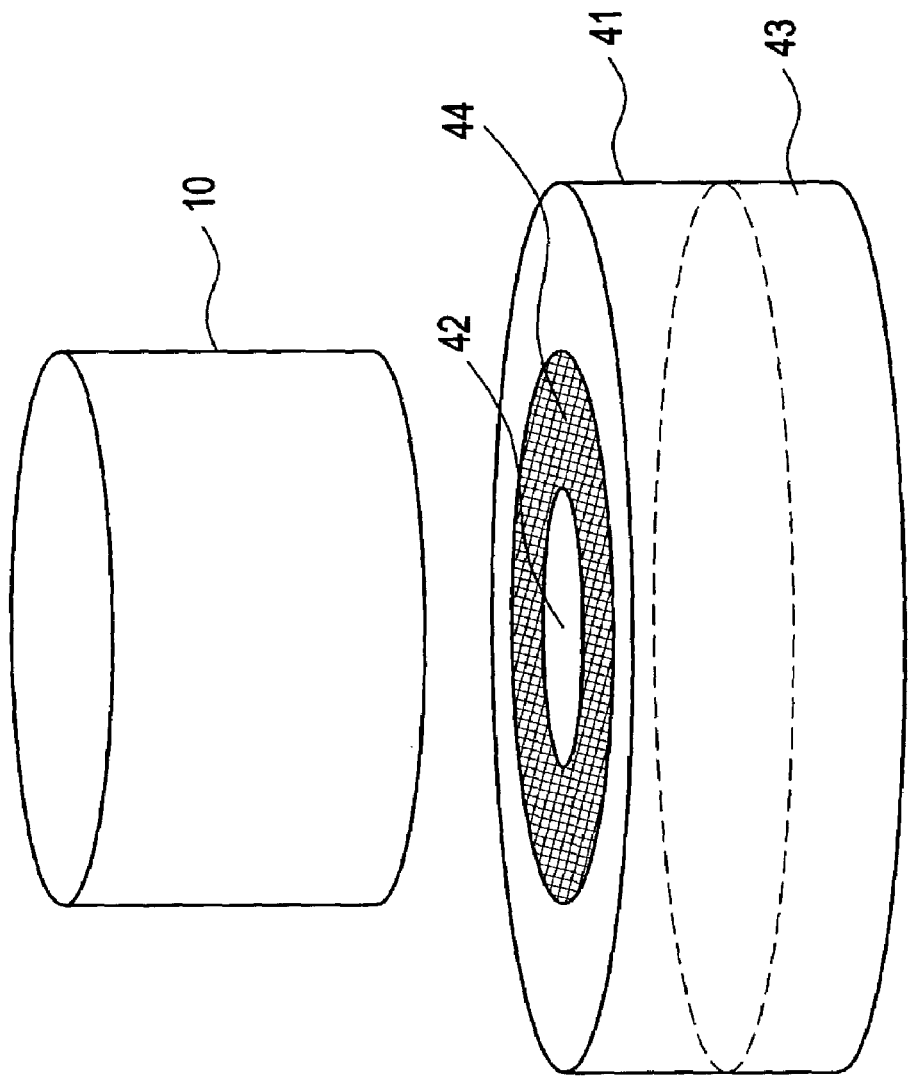

MULTI-ZONED CATALYST AND TRAP

This application is a continuation-in-part of copending U.S. patent application Ser. No. 10/183,863, filed Jun. 27, 2002, which is hereby incorporated by reference in its entirety.

The present invention relates to multi-zoned catalysts that trap and combust hydrocarbon and nitrogen oxides pollutants in a single monolith substrate. The invention also relates to exhaust gas treating systems that incorporate the multi-zoned catalysts.

Catalytic converters are well known for the removal and/or conversion of the harmful components of exhaust gases. Catalytic converters have a variety of constructions for this purpose. In one form, the converter comprises a rigid skeletal monolithic substrate on which there is a catalytic coating. The monolith has a honeycomb-type structure which has a multiplicity of longitudinal passages, typically in parallel, to provide a catalytically coated body having a high surface area.

Monolithic honeycombs containing different catalyst compositions are disposed in zones along the length of the honeycomb are known for use in catalytic combustion processes from references such as WO 92/09848. It is disclosed that graded catalyst structures can be made on ceramic and metallic monolith structures by a variety of processes.

Copending U.S. patent application Ser. No. 09/067,820, filed Apr. 28, 1998 herein incorporated by reference, also discloses the use of zoned catalyst structures, as well as methods for their preparation. The zoned catalyst structures comprise coated honeycomb substrates having different zones along the length of the passages. The zones are defined by their coating (or lack of coating) and extend for a length of the channel in which there is the same coating and architecture. Soluble components, such as catalytic components (e.g., platinum group metals) or promoters (e.g., rare earth metal salts) in coating compositions are fixed in their respective zones.

Other references, such as Sugiura et al. *Society of Automotive Engineering* 962076 (1996) disclose, inter alia, the effect of varying the noble metal loading patterns along a radial coordinate in an upstream segment of a honeycomb monolith on the carbon monoxide (CO) and total hydrocarbon (THC) conversion efficiency. Sugiura et al. discloses that loading patterns such as these can be used to optimize the quantity of noble metal catalysts deposited in discrete areas of the monolith in view of such factors such as the temperature distribution and the distribution of pollutant species within the monolith.

In order to meet ever more stringent emission standards set by various regulatory agencies, such as the proposed SULEV emissions regulations, with minimum manufacturing and material costs, it is desirable to refine zone-coating technologies and optimize placement of particular catalytic or pollutant adsorbent compositions along the catalyst's length and radius. Refinements in catalyst architecture include optimizing placement of catalytic or pollutant adsorbent compositions along the substrate's length and radius.

SUMMARY OF THE INVENTION

In one aspect, the invention relates to an exhaust gas treatment catalyst that has both axial and radial zones (see, for example, FIG. 4). The exhaust gas treatment catalyst has a substrate with a longitudinal axis, an inlet end, an outlet end, having a length extending between the inlet end to the outlet end, a plurality of passages, wherein each of the passages is tubularly enclosed by an internal surface of the substrate. The plurality of passages includes a first group of passages and a second group of passages. The internal surfaces of the first and second groups of passages have a trap layer and a first catalytic layer. The trap layer is interposed between the internal surfaces of the substrate and the first catalytic layer (see, for example, FIG. 5A). The second group of passages has a second catalytic layer, in addition to the trap layer and first catalytic layer. The downstream second catalytic layer is disposed on the first catalytic layer. Preferably, the second catalytic layer begins from the outlet end, and extends for no more than 50% of the substrate's length (see, for example, FIG. 8A).

The trap layer has a hydrocarbon trap segment that contains a hydrocarbon adsorbent, and a NOx trap segment that contains a NOx adsorbent. The hydrocarbon trap segment may abut the NOx trap segment, or the two trapping segments may overlap. Preferably, the hydrocarbon trap segment abuts the NOx trap segment. In some embodiments, the hydrocarbon adsorbent has zeolite material. Typically, the NOx adsorbent has one or more alkaline earth metal components.

In a preferred embodiment of the exhaust gas treatment catalyst, the hydrocarbon trap segment begins from the inlet end, and extends part of the substrate's length; and the NOx trap segment begins from the outlet end and extends for part of the substrate's length.

The first catalytic layer has an inlet catalytic segment containing an inlet platinum component and an inlet rhodium component, and an outlet catalytic segment containing an outlet platinum component and an outlet rhodium component. The inlet catalytic segment can abut the outlet catalytic segment, or the two catalytic segments can overlap. Preferably, the inlet catalytic segment abuts the outlet catalytic segment.

In a preferred embodiment of the exhaust gas treatment catalyst, the inlet catalytic segment contains from about 12.5 to 200 g/ft$^3$ of the inlet platinum component and about 2.5 to 25 g/ft$^3$ of the inlet rhodium component. The inlet catalytic segment can also contain an oxygen storage component, which is preferably in the form of a diluted oxygen storage composition.

In another preferred embodiment of the exhaust gas treatment catalyst, the outlet catalytic segment comprises from about 12.5 to 100 g/ft$^3$ of the outlet platinum component and from about 2.5 to 25 g/ft$^3$ of the outlet rhodium component. The outlet catalytic segment can also contain an oxygen storage component, which is preferably in the form of a diluted oxygen storage composition.

The second catalytic layer has a second platinum component. The second catalytic layer preferably contains from about 25 to 100 g/ft$^3$ of the second platinum component. In some embodiments of the exhaust gas treatment catalyst, the second catalytic layer also contains a second rhodium component, preferably in a concentration of about 25 to 100 g/ft$^3$.

In a preferred embodiment of the exhaust gas treatment catalyst, the plurality of passages consist of no more than 60% of the second group of passages. The first group of passages can be disposed in any shape; however, in a preferred embodiment, the first group of passages are disposed in a toroidal pattern about the substrate's longitudinal axis.

In certain embodiments of the exhaust gas treatment catalyst, the first and second group of passages further have an undercoat interposed between the trap layer and the internal surfaces of the substrate (see, for example, FIGS. 6A–C, 8B). Typically, the undercoat contains a refractory inorganic oxide selected from alumina, zirconia, ceria and composites thereof.

In other embodiments of the exhaust gas treatment catalyst, the first and second group of passages also have a barrier layer interposed between the first catalytic layer and the trap layer (see, for example, FIGS. 7A–C, 8C). Typically, the barrier layer contains a refractory inorganic oxide selected from alumina, zirconia, ceria and composites thereof.

In another aspect, the invention relates to an exhaust gas treatment system, with at least one upstream catalyst and a downstream catalyst, wherein the downstream catalyst has both axial and radial zones. The downstream catalyst in the system has a downstream substrate comprising a longitudinal axis, a downstream inlet end, a downstream outlet end, having a length extending between the inlet end to the outlet end, a plurality of downstream passages, wherein each of the downstream passages is tubularly enclosed by an internal surface of the downstream substrate. The plurality of downstream passages includes a first group of downstream passages and a second group of downstream passages. The internal surfaces of the first and second groups of downstream passages have a downstream trap layer and a downstream first catalytic layer. The downstream trap layer is interposed between the internal surfaces of the downstream substrate and the downstream first catalytic layer. The second group of downstream passages has a downstream second catalytic layer, in addition to the downstream trap layer and downstream first catalytic layer. The downstream second catalytic layer is disposed on the downstream first catalytic layer. Preferably, the downstream catalytic layer begins from the downstream outlet end, and extends for no more than 50% of the downstream substrate's length.

The downstream trap layer has a hydrocarbon trap segment that contains a hydrocarbon adsorbent, and a NOx trap segment that contains a NOx adsorbent. The hydrocarbon trap segment can abut the NOx trap segment, or the two trapping segments can overlap. Preferably, the hydrocarbon trap segment abuts the NOx trap segment in the downstream catalyst. In some embodiments, the hydrocarbon adsorbent contains zeolite material. Typically, the NOx adsorbent contains one or more alkaline earth metal components.

In a preferred embodiment of the exhaust gas treatment system, the hydrocarbon trap segment of the downstream catalyst begins from the downstream inlet end, and extends part of the downstream substrate's length; and the NOx trap segment begins from the downstream outlet end, and extends for part of the downstream substrate's length.

The first downstream catalytic layer has a downstream inlet catalytic segment containing a downstream inlet platinum component and a downstream inlet rhodium component; and a downstream outlet catalytic segment containing a downstream outlet platinum component and a downstream outlet rhodium component. The downstream inlet catalytic segment can abut the downstream outlet catalytic segment, or the two downstream catalytic segments can overlap. Preferably, the downstream catalytic segment abuts the downstream outlet catalytic segment.

In a preferred embodiment of the exhaust gas treatment system, the downstream inlet catalytic segment of the downstream catalyst has from about 12.5 to 200 g/ft$^3$ of the downstream inlet platinum component and about 2.5 to 25 g/ft$^3$ of the downstream inlet rhodium component. The downstream inlet catalytic segment can also contain an oxygen storage component, which is preferably in the form of a diluted oxygen storage composition.

In another preferred embodiment of the exhaust gas treatment system, the downstream outlet catalytic segment of the downstream catalyst has from about 12.5 to 100 g/ft$^3$ of the downstream outlet platinum component and from about 2.5 to 25 g/ft$^3$ of the downstream outlet rhodium component. The downstream outlet catalytic segment can also contain an oxygen storage component, which is preferably in the form of a diluted oxygen storage composition.

The downstream second catalytic layer contains a downstream second platinum component, which is preferably disposed in a concentration of from about 25 to 100 g/ft$^3$. In some embodiments of the exhaust gas treatment system, the downstream second catalytic layer contains a downstream second rhodium component, preferably in a concentration of about 25 to 100 g/ft$^3$.

In a preferred embodiment of the exhaust gas treatment system, the plurality of downstream passages in the downstream catalyst consist of no more than 60% of the second group of downstream passages. The first group of downstream passages can be formed in any pattern, but preferably the first group of downstream passages are disposed in a toroidal pattern about the downstream substrate's longitudinal axis.

In certain embodiments of the exhaust gas treatment system, the first and second group of downstream passages further have a downstream undercoat interposed between the downstream trap layer and the internal surfaces of the downstream substrate. Typically, the downstream undercoat contains a refractory inorganic oxide selected from alumina, zirconia, ceria and composites thereof.

In other embodiments of the exhaust gas treatment system, the first and second group of downstream passages also have a downstream barrier layer interposed between the downstream first catalytic layer and the downstream trap layer. Typically, the downstream barrier layer contains a refractory inorganic oxide selected from alumina, zirconia, ceria and composites thereof.

In a preferred embodiment of the exhaust gas treatment system the downstream catalyst is as recited above, and the upstream catalyst is a coated catalyst substrate containing several axial zones. The upstream catalyst preferably has an upstream substrate with an upstream longitudinal axis, an upstream inlet end, an upstream outlet end, having a length extending between the upstream inlet end to the upstream outlet end, and a plurality of upstream passages. Each of the upstream passages is tubularly enclosed by an internal surface of the upstream substrate. The internal surfaces of the upstream substrate have an upstream first catalytic layer, and an upstream second catalytic layer. The upstream first catalytic layer is interposed between the internal surfaces of the upstream substrate and the upstream second catalytic layer.

The upstream first catalytic layer has an upstream first inlet catalytic segment and an upstream first outlet catalytic segment. The upstream first inlet catalytic segment contains an upstream first inlet palladium component, and the upstream first outlet catalytic segment contains an upstream first outlet platinum component and an upstream first outlet rhodium component. Preferably, the upstream first inlet catalytic segment contains from about 30 to about 520 g/ft$^3$ of the upstream first inlet palladium component. Optionally, the first inlet catalytic segment also contains from about 2 to about 112 g/ft$^3$ of an upstream first inlet platinum component. Preferably, the upstream first outlet catalytic segment contains from about 2 g/in$^3$ to about 260 g/ft$^3$ of the upstream first outlet platinum component, and from about 2 g/ft³ to about 52 g/ft³ of the upstream first outlet rhodium component.

In a preferred embodiment, the upstream first inlet catalytic segment and upstream first outlet catalytic segment each further contain an oxygen storage component, which is preferably in the form of a diluted oxygen storage composition.

The upstream second catalytic layer is disposed on the upstream first catalytic layer, and preferably begins from the upstream inlet end, and extends for no more than 50% of the upstream substrate's length. The upstream second catalytic layer contains an upstream second palladium component, which is preferably in a concentration of 50 g/ft³ to about 350 g/ft³.

In a preferred embodiment of the exhaust gas treatment system, the upstream first inlet catalytic segment begins from the upstream inlet end and extends part of the upstream substrate's length; and the upstream first outlet catalytic segment begins from the upstream outlet end, and extends part of the upstream substrate's length. In this configuration, the upstream first outlet catalytic segment at least partially overlies the upstream first inlet catalytic segment in the upstream catalyst. Preferably, the upstream first inlet and upstream first outlet catalytic segments each extend to a length of at least 60% of the upstream substrate's axial length.

In certain embodiments of the exhaust gas treatment system, the upstream catalyst has an upstream undercoat interposed between the upstream first catalytic layer and the internal surfaces of the upstream substrate. Typically, the upstream undercoat contains a refractory inorganic oxide selected from alumina, zirconia, ceria and composites thereof.

In another aspect, the invention relates to an exhaust gas treatment catalyst that has several axial zones. The exhaust gas treatment catalyst has a substrate with a longitudinal axis, an inlet end, an outlet end, having a length-extending between the inlet end to the outlet end, a plurality of passages, wherein each of the passages is tubularly enclosed by an internal surface of the substrate. In this aspect of the invention, the internal surfaces of the substrate have a trap layer, a first catalytic layer, and a second catalytic layer. The trap layer is interposed between the internal surfaces of the substrate and the first catalytic layer. The second catalytic layer is disposed on the first catalytic layer, begins from the outlet end, and extends for no more than 50% of the substrate's length (see, for example, FIG. 8A).

The trap layer comprises a hydrocarbon trap segment with a hydrocarbon adsorbent, and a NOx trap segment with a NOx adsorbent. The hydrocarbon and NOx trap segments may abut, or the two trap segments may overlap. Preferably, the two trap segments abut. Typically, the hydrocarbon trap adsorbent material contains zeolite material, and the NOx adsorbent material contains has one or more alkaline earth metal components.

In a preferred embodiment of the exhaust gas treatment catalyst, the hydrocarbon trap segment begins from the inlet end, and extends part of the substrate's length; and the NOx trap segment begins from the outlet end, and extends for part of the substrate's length.

The first catalytic layer has an inlet catalytic segment containing an inlet platinum component and an inlet rhodium component, and an outlet catalytic segment containing an outlet platinum component and an outlet rhodium component. The inlet catalytic segment can abut the outlet catalytic segment, or the two catalytic segments can overlap. Preferably, the inlet catalytic segment abuts the outlet catalytic segment.

In a preferred embodiment of the exhaust gas treatment catalyst, the inlet catalytic segment contains from about 12.5 to 200 g/ft³ of the inlet platinum component and about 2.5 to 25 g/ft³ of the inlet rhodium component. The inlet catalytic segment can also contain an oxygen storage component, which is preferably in the form of a diluted oxygen storage composition.

In another preferred embodiment of the exhaust gas treatment catalyst, the outlet catalytic segment contains from about 12.5 to 100 g/ft³ of the outlet platinum component and from about 2.5 to 25 g/ft³ of the outlet rhodium component. The outlet catalytic segment can also contain an oxygen storage component, which is preferably in the form of a diluted oxygen storage composition.

The second catalytic layer has a second platinum component. The second catalytic layer preferably contains from about 25 to 100 g/ft³ of the second platinum component. In some embodiments of the exhaust gas treatment catalyst, the second catalytic layer also contains a second rhodium component, preferably in a concentration of about 25 to 100 g/ft³.

In certain embodiments of the exhaust gas treatment catalyst, the passages also have an undercoat interposed between the trap layer and the internal surfaces of the substrate (see, for example, FIG. 8B). Typically, the undercoat contains a refractory inorganic oxide selected from alumina, zirconia, ceria and composites thereof.

In other embodiments of the exhaust gas treatment catalyst, the passages also have a barrier layer interposed between the first catalytic layer and the trap layer (see, for example, FIG. 8C). Typically, the barrier layer contains a refractory inorganic oxide selected from alumina, zirconia, ceria and composites thereof.

In another aspect, the invention relates to an exhaust gas treatment system, with at least one upstream catalyst and a downstream catalyst, wherein the downstream catalyst has several axial zones. The downstream catalyst has a downstream substrate having a longitudinal axis, a downstream inlet end, a downstream outlet end, having a length extending between the downstream inlet end to the downstream outlet end, a plurality of downstream passages, wherein each of the downstream passages is tubularly enclosed by an internal surface of the downstream substrate. Each of the internal surfaces of the downstream substrate has a downstream trap layer, a downstream first catalytic layer and a downstream second catalytic layer. The downstream trap layer is interposed between the internal surfaces of the downstream-substrate and the first catalytic layer. The downstream second catalytic layer is disposed on the downstream first catalytic layer, begins from the downstream outlet end, and extends for no more than 50% of the downstream substrate's length.

The downstream trap layer has a hydrocarbon trap segment with a hydrocarbon adsorbent, and a NOx trap segment with a NOx adsorbent. The hydrocarbon and NOx trap segments may abut, or the two trap segments may overlap. Preferably, the two trap segments abut. Typically, the hydrocarbon trap adsorbent material contains zeolite material, and the NOx adsorbent material contains one or more alkaline earth metal components.

In a preferred embodiment of the exhaust gas treatment system, the hydrocarbon trap segment of the downstream catalyst begins from the downstream inlet end, and extends part of the downstream substrate's length; and the NOx trap segment begins from the downstream outlet end, and extends for part of the downstream substrate's length.

The first downstream catalytic layer has a downstream inlet catalytic segment containing a downstream inlet platinum component and a downstream inlet rhodium component; and a downstream outlet catalytic segment containing a downstream outlet platinum component and a downstream outlet rhodium component. The downstream inlet catalytic segment can abut the downstream outlet catalytic segment, or the two downstream catalytic segments can overlap. Preferably, the downstream catalytic segment abuts the downstream outlet catalytic segment.

In a preferred embodiment of the exhaust gas treatment system, the downstream inlet catalytic segment of the downstream catalyst has from about 12.5 to 200 g/ft$^3$ of the downstream inlet platinum component and about 2.5 to 25 g/ft$^3$ of the downstream inlet rhodium component. The downstream inlet catalytic segment can also contain an oxygen storage component, which is preferably in the form of a diluted oxygen storage composition.

In another preferred embodiment of the exhaust; gas treatment system, the downstream outlet catalytic segment of the downstream catalyst has from about 12.5 to 100 g/ft$^3$ of the downstream outlet platinum component and from about 2.5 to 25 g/ft$^3$ of the downstream outlet rhodium component. The downstream outlet catalytic segment can also contain an oxygen storage component, which is preferably in the form of a diluted oxygen storage composition.

The downstream second catalytic layer contains a downstream second platinum component, which is preferably disposed in a concentration of from about 25 to 100 g/ft$^3$. In some embodiments of the exhaust gas treatment catalyst, the downstream second catalytic layer contains a downstream second rhodium component, preferably in a concentration of about 25 to 100 g/ft$^3$.

In certain embodiments of the exhaust gas treatment system, the downstream passages also have a downstream undercoat interposed between the downstream trap layer and the internal surfaces of the downstream substrate. Typically, the downstream undercoat contains a refractory inorganic oxide selected from alumina, zirconia, ceria and composites thereof.

In other embodiments of the exhaust gas treatment system, the downstream passages also have a downstream barrier layer interposed between the downstream first catalytic layer and the downstream trap layer. Typically, the downstream barrier layer contains a refractory inorganic oxide selected from alumina, zirconia, ceria and composites thereof.

In a preferred embodiment of the exhaust gas treatment system, the downstream catalyst as described above, and the upstream catalyst is a catalyst containing several axial zones. The upstream catalyst preferably has an upstream substrate with an upstream longitudinal axis, an upstream inlet end, an upstream outlet end, having a length extending between the upstream inlet end to the upstream outlet end, and a plurality of upstream passages. Each of the upstream passages is tubularly enclosed by an internal surface of the upstream substrate. The internal surfaces of the upstream substrate have an upstream first catalytic layer and an upstream second catalytic layer. The upstream first catalytic layer is interposed between the internal surfaces of the upstream substrate and the upstream second catalytic layer.

The upstream first catalytic layer has an upstream first inlet catalytic segment and an upstream first outlet catalytic segment. The upstream first inlet catalytic segment contains an upstream first inlet palladium component, and the upstream first outlet catalytic segment contains an upstream first outlet platinum component and an upstream first outlet rhodium component. Preferably, the upstream first inlet catalytic segment contains from about 30 to about 520 g/ft$^3$ of the upstream first inlet palladium component. Optionally, the first inlet catalytic segment also contains from about 2 to about 112 g/ft$^3$ of an upstream first inlet platinum component. Preferably, the upstream first outlet catalytic segment contains from about 2 g/in$^3$ to about 260 g/ft$^3$ of the upstream first outlet platinum component, and from about 2 g/ft$^3$ to about 52 g/ft$^3$ of the upstream first outlet rhodium component.

In a preferred embodiment, the upstream first inlet catalytic segment and upstream first outlet catalytic segment each further contain an oxygen storage component, which is preferably in the form of a diluted oxygen storage composition.

The upstream second catalytic layer is disposed on the upstream first catalytic layer, preferably begins from the upstream inlet end, and extends for no more than 50% of the upstream substrate's length. The upstream-second catalytic layer contains an upstream second palladium component, which is preferably in a concentration of 50 g/ft$^3$ to about 350 g/ft$^3$.

In a preferred embodiment of the exhaust gas treatment system, the upstream first inlet catalytic segment begins from the upstream inlet end, and extends part of the upstream substrate's length; and the upstream-first outlet catalytic segment begins from the upstream outlet end, and extends part of the upstream substrate's length. In this configuration, the upstream first outlet catalytic segment at least partially overlies the upstream first inlet catalytic segment in the upstream catalyst. Preferably, the upstream first inlet and upstream first outlet catalytic segments each extend to a length of at least 60% of the upstream substrate's axial length.

In certain embodiments of the exhaust gas treatment system, the upstream catalyst has an upstream undercoat interposed between the upstream first catalytic layer and the internal surfaces of the upstream substrate. Typically, the upstream undercoat contains a refractory inorganic oxide selected from alumina, zirconia, ceria and composites thereof.

BRIEF DESCRIPTION OF THE DRAWINGS

FIG. 1 is a view of in perspective of a honeycomb substrate.

FIG. 2 is a sectional view of the honeycomb of FIG. 1 along Section 2—2.

FIG. 4 shows one embodiment of a monolith substrate having both radial and axial zones.

FIGS. 10A–10B show exemplary coating designs of an upstream catalyst substrate for an exhaust system of the invention.

FIG. 11 is a schematic flow chart illustrating a method of preparing the zoned catalyst architectures of the present invention.

FIG. 12 is an illustration depicting a dip pan useful for coating substrates having radial zones.

DEFINITIONS

Figure 3B:
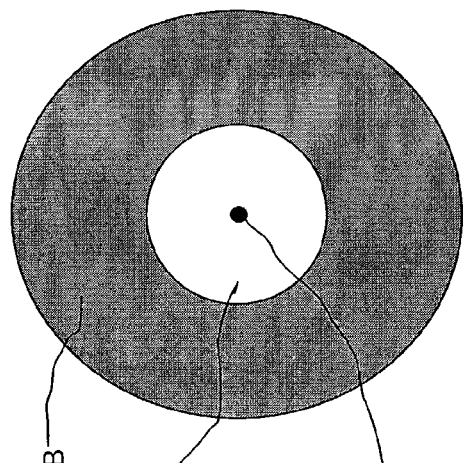
FIGS. 3A–3B are end-on views of a honeycomb substrates having concentric radial zones.

The following terms shall have, for the purposes of this application, the respective meanings set forth below.

"Architecture" is used to mean the physical design of the coating in a zone considering parameters such as the number of layers of coating compositions, the thickness of the layers, and the order of layers where there are more than one layer.

"Downstream" and "Upstream," when used to describe a catalyst substrate or zone, refer to the relative positions in the exhaust system as sensed in the direction of the flow of the exhaust gas stream.

DETAILED DESCRIPTION OF THE INVENTION

The present invention provides a practical means for improving the emission levels of light-duty vehicles including passenger cars and light duty trucks, and is capable of reducing the emission levels of these vehicles to the SULEV certification level while minimizing platinum group metal costs.

The present invention is directed to improved zone-coated catalyst substrates and exhaust systems containing such substrates. Specified placement of the coating compositions on the substrate can optimize use of platinum group metal by placing the compositions containing high concentrations of platinum group metals in regions of the substrate wherein the bulk of the exhaust gas flows and bulk of the pollutant conversion (e.g., hydrocarbon and carbon monoxide oxidation and nitric oxides reduction) occurs. In addition, specified placement of coating compositions on the substrate facilitates the preparation of multifunctional substrates. Such multifunctional substrates can carry out a variety of catalyst functions such as storage and combustion of unburned hydrocarbons during engine startup, and storage and reduction of nitrogen oxides during transient operation.

The current invention integrates several catalytic coating designs into a single catalyst substrate to provide a multifunctional catalyst. The coating designs used to prepare the substrate define a plurality of zones that are optimized to provide specific catalyst functions such as nitrogen oxides (NOx) trapping, hydrocarbon trapping, and enhanced conversions of hydrocarbons and NOx.

As can be seen in FIGS. 1 and 2, honeycomb monolith substrates (10) comprise an outer surface (12), an inlet axial end (14) and an outlet axial end (14'). There are a plurality of passages (16) defined by the internal surfaces (18) of the substrate. Each passage has a corresponding inlet and outlet. The substrate has an axis of symmetry (19) (or simply, "axis") along the axial length of the substrate.

In coating the substrates, various coating compositions or coating slurries, referred to as "washcoats" are disposed along specified regions of the substrate. In one aspect, the coating can extend along a specified axial length of the substrate to form substrates containing "axial zones". The axial zones are defined by their coating and extend for a length of the passage in which there is the same coating and architecture. In substrates with axial zones, the internal surfaces (18) of the different zones are coated with different catalyst compositions or architectures. The term "architecture" is used to mean the physical design of the coating in a zone considering parameters such as the number of layers of coating compositions, the thickness of the layers, and the order of layers where there are more than one layer. For example, an axial segment of the substrate with a specified coating architecture defines a zone until it bounds with an adjacent zone having different coating compositions or a different numbers of layers. For example in FIG. 2, there are defined three axial zones, an upstream zone (20), an intermediate zone (24) and a downstream zone (22).

Figure 3C:
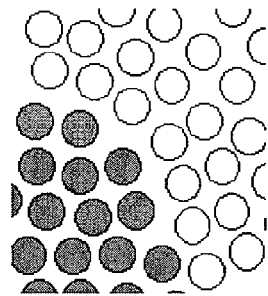
FIG. 3C is an exploded view of Section X from the substrate in FIG. 3A.

In another aspect, the coating can be preferentially deposited in specified passages about the axis of the substrate to form various radial patterns, referred to herein as "radial zones". The radial zones are defined by the pattern of coated passages when viewed from a direction along the substrate's axis (19), such an axial end of a substrate. For example, as seen from an end view of the substrate in FIG. 3A, coating patterns of the various passages can extend from the axial enter of the substrate to form, for example, a disc-like pattern of coated passages that defines an inner radial zone (17A) that have a different coating architecture than the passages in peripheral radial zone (21A). For illustrative purposes, FIG. 3C shows an exploded view of Section X from the substrate in FIG. 3A having the coated and uncoated passages along the boundary between the radial zones 17A and 21A.

These two aspects of coating design can be used in combination to form zones within the substrate wherein zones are defined in both the axial and radial directions of the substrate. An exhaust gas stream, passing from the inlet axial end to the outlet axial end, encounters different catalyst layers (or pollutant trap layers) or different combinations of catalyst layers as it passes from one axial zone of the catalyst to another. In addition, depending on gas flow patterns within the substrate, an exhaust gas stream can encounter different catalyst layers or different combinations of catalyst layers as it passes from one radial zone of the catalyst to another.

Catalyst A

One embodiment of the invention, relates to a coated substrate that is particularly effective for high pollutant conversions. For economy of expression this catalyst substrate is referred to herein as "Catalyst A". The catalyst contains a trap layer that contains both nitrogen oxides (NOx) adsorbent material and a hydrocarbon adsorbent material. The substrate also contains first and second catalytic layers formed from washcoat compositions containing platinum group metal components.

The coating design of Catalyst A allows the catalyst to maintain effective pollutant performance throughout the exhaust gas treatment cycle. For example, the composition of exhaust streams from internal engines can vary during the course of operation with respect to the air/fuel (A/F) ratio, i.e., the exhaust streams can be rich or lean of stoichiometric during operation. The oscillation in A/F ratio can lead to incomplete reduction of the nitrogen oxides (NOx) component of the exhaust gas. The catalyst of the invention is provided with a NOx trap segment containing NOx trap material that effectively adsorbs the NOx component of the exhaust gas that remains untreated during fuel lean conditions, and releases the component when the exhaust gas returns to fuel rich conditions. Catalyst A is provided with a downstream zone (referred to herein as a "burn-off zone") where enhanced conversion of the NOx component occurs. The NOx trap segment and the burn-off zone function in tandem to effectively widen the effective window where the NOx component of the exhaust can be effectively treated (i.e., with respect to the A/F ratio of the exhaust stream).

In another aspect, Catalyst A can also maintain effective pollutant abatement performance through a wide range of catalyst temperatures that commonly occur during operation of the vehicle. For example, the temperature of the catalyst substrate does not immediately reach an optimum temperature for combustion of unburned hydrocarbons emerging from the exhaust gas-manifold upon startup, and therefore, incomplete combustion of unburned hydrocarbon can occur. Catalyst A is provided with a hydrocarbon trap segment containing hydrocarbon trap material that adsorbs the hydrocarbon component of the exhaust at temperatures below which the catalyst is less effective for hydrocarbon combustion. The hydrocarbons are then released as the substrate temperature increases, and the hydrocarbon component of the exhaust is then combusted in the downstream burn-off zone of the substrate. Similar to the operation with respect to treatment of the NOx component, the hydrocarbon trap segment and the burn-off zone operate in tandem to effectively treat the hydrocarbon component of the exhaust through a wide range of catalyst temperatures.

In one coating design alternative for Catalyst A, designated as "Design A1" there is defined a plurality of axial and radial zones that are formed using two different groups of passages, a first and second group, each of which has a different coating design. Each of the internal surfaces of the first and second group of passages in Design A1 have a trap layer and a first catalytic layer. The second group of passages have a second catalytic layer in a downstream segment of the substrate in addition to the trap layer and first catalytic layer. The presence of the second catalytic layer defines the passages and lengths of the passages that are in the burn-off zone.

For example, FIG. 4A, shows one preferred embodiment of Design A1 of a zone-coated monolith substrate. This zone coated catalyst substrate has an upstream zone (20), an intermediate zone (24) and a downstream zone (22). The downstream zone has one portion (22A) defined by an additional coating composition that is deposited only in those passages that are in the inner radial core of the monolith substrate. Another portion of the downstream zone (22B) is defined by the absence of the additional coating composition in those passages that are outside the inner radial core. FIG. 4B shows the downstream zones of the substrate when viewed in cross-section. Cross-sectional views of the intermediate and upstream zones are shown for comparative purposes.

Figure 5A:
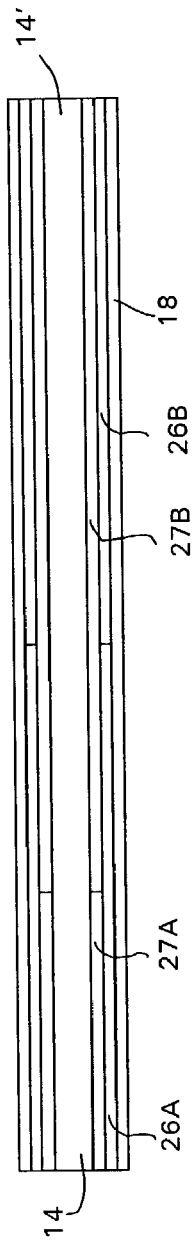
FIGS. 5A–C show certain embodiments of a coating design for the first group of passages of Design A1 in sectional view of a single passages.
Figure 5B:
Figure 5C:
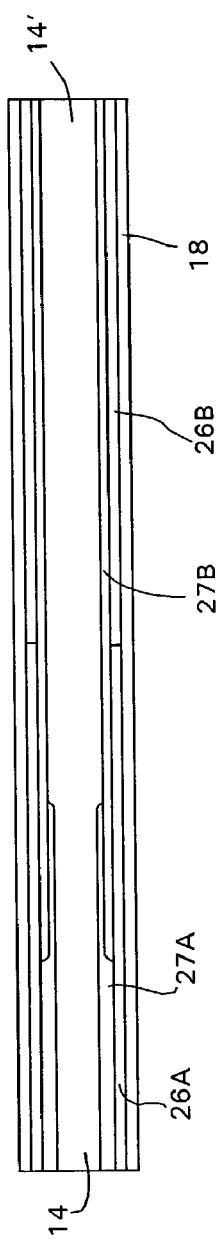

FIGS. 5A–C shows certain embodiments of a coating design for the first group of passages of Design A1 in a sectional view of a single passage. (The numbering of the layers, segments and internal passages are consistent throughout FIGS. 5A–C, 6A–C, 7A–C, 8A–C, and 10A–B). The trap layer (26) is disposed on the internal surfaces (18) of the substrate, and is composed of a hydrocarbon trap segment (26A) and a NOx trap segment (26B). The internal ends of the two segments 26A and 26B may abut one another as shown FIGS. 5A or 5C, or alternatively, the two segments may overlap such as that shown in FIG. 5B. Preferably, the inlet hydrocarbon trap segment is disposed upstream of the NOx trap segment, although in some embodiments the position of these segments within the trap layer can be interchanged. Generally, the length of each of the hydrocarbon and NOx trap segments is about 5 to 95% of the axial length of the substrate, and preferably, the length of each of the segments is 30 to 70% of the axial length of the substrate.

The first catalytic layer (27) is disposed on the trap layer, and is composed of an inlet catalytic segment (27A) and an outlet catalytic segment (27B). The internal ends of the segments 27A and 27B may abut one another as shown in FIGS. 5A or 5B, or alternatively, the two segments can overlap as shown in FIG. 5C. Generally, the length of the inlet catalytic segment is about 5 to 95% of the axial length of the substrate, and preferably, the length of the inlet segment is 30 to 70% of the axial length of the substrate. The length of the outlet catalytic segment is generally about 5 to 95% of the axial length of the substrate, and preferably, the length of the outlet catalytic segment is 30 to 70% of the axial length of the substrate.

Figure 8A:
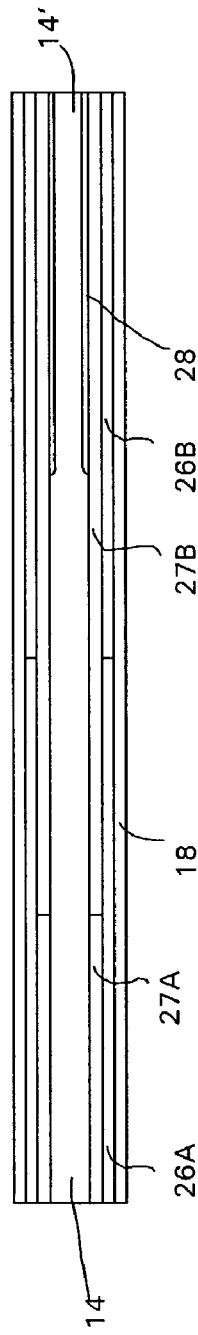
FIGS. 8A–C are sectional views of a single passages with alternative coating designs for the second group of passages.

The second group have passages having Design A1 have a second catalytic layer (28), in addition to the undercoat, trap layer and first catalytic layer as seen in the coating design of a single passage in the-sectional view of FIG. 8A. The second catalytic layer is typically coated from the outlet end to the inlet end for a length of 20 to 70% of the substrate's axial length, and preferably, for a length that is 30 to 60% of the substrate's axial length. (It will be readily apparent to those of skill in the art, that the two trap segments can overlap (not shown), and that the two catalytic segments that comprise the first catalytic layer can overlap (not shown) in the second group of passages.)

Figure 3A:
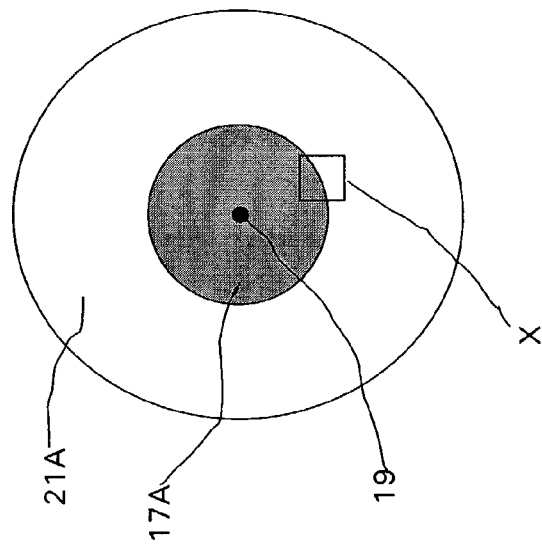

The patterns formed by the particular pattern groupings of the first and second group of passages form at least two radial zones near the outlet end of the substrate. These passages can form a variety of patterns when viewed along the substrate's axis (19) from the outlet axial end. For example, the second group of passages can form a disc-like pattern as seen in FIG. 3A, or they may also form a toroidal pattern as seen in FIG. 3B. Typically, about 25% to 75% of the passages of the substrate have the coating design of the herein described second group of passages. More preferably, 40% to 60% of the passages of the substrate have the coating design of the second group of passages. The pattern formed by the second group of passages may be concentric or eccentric with respect to the substrate's axis, so that the coating design can be tailored to different flow patterns of the exhaust gases through the substrate.

Figure 6A:
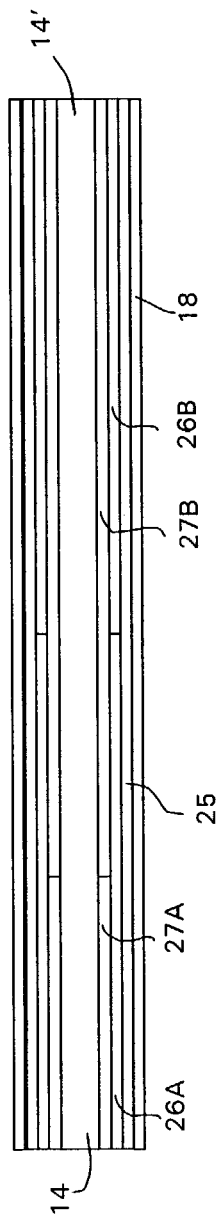
FIGS. 6A–C are sectional views of a single passage that show certain embodiments of Design A1 for the first group of passages having an undercoat.
Figure 6B:
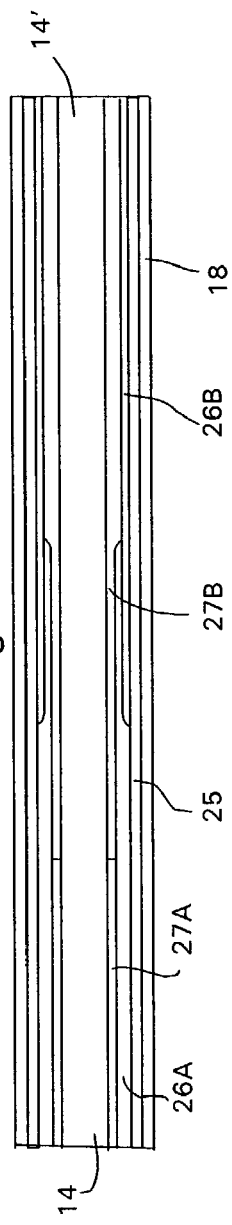
Figure 6C:
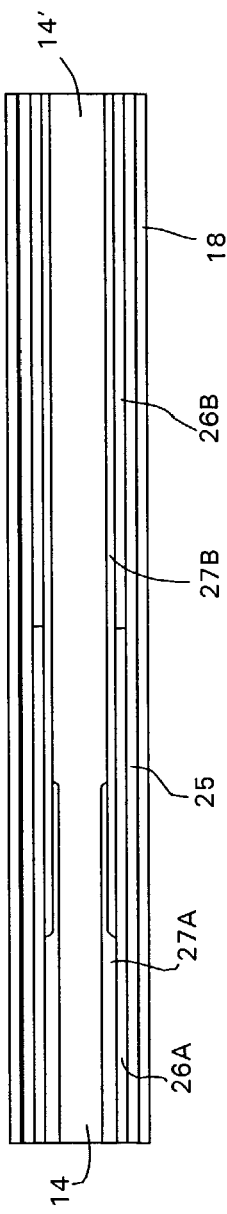
Figure 8B:
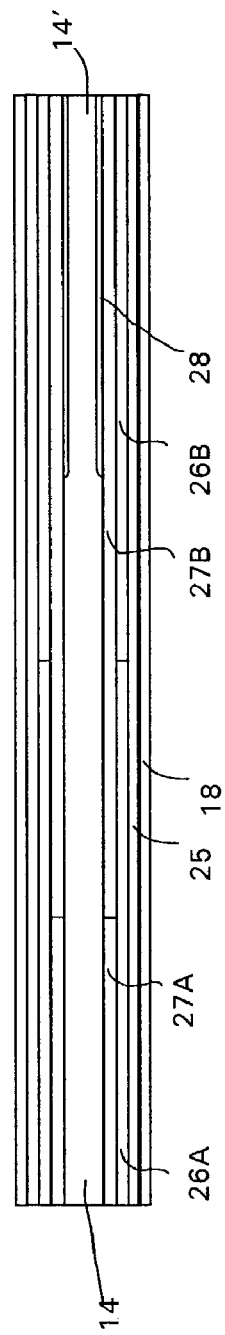

In another variation of Design A1 each of the internal surfaces of the first and second group of passages in Design A1 are provided with an undercoat, in addition to the trap layer and catalytic layer(s). FIGS. 6A–C, for example, show certain embodiments of this variation of Design A1 for the first group of passages in a sectional view of a single passage. The undercoat (25), which is typically formed from a washcoat composed of base metal components, is interposed between-the internal surfaces (18) of the substrate and the trap layer (26). The undercoat preferably extends from the inlet end to the outlet end of the substrate so that it can serve, among other things, as a barrier to prevent migration of components from the trap layer into the substrate, such as alkali and alkaline earth metal components that can degrade the structural integrity of ceramic substrates. FIG. 8B shows a sectional view of a single passage for a passage of the second group of passages having an undercoat.

Figure 7A:
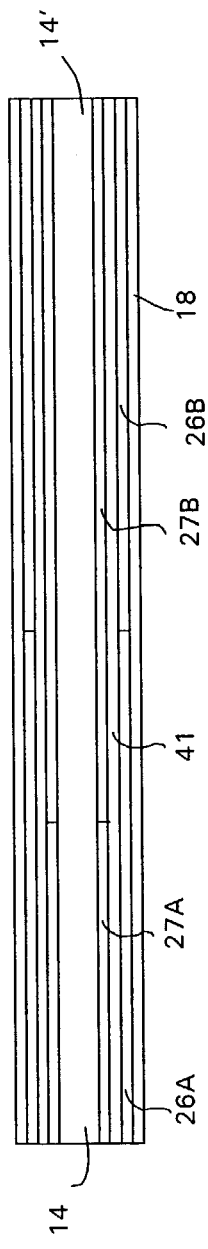
FIGS. 7A–C are sectional views of a single passage that show certain embodiments of Design A1 for the first group of passages having a barrier layer.
Figure 7B:
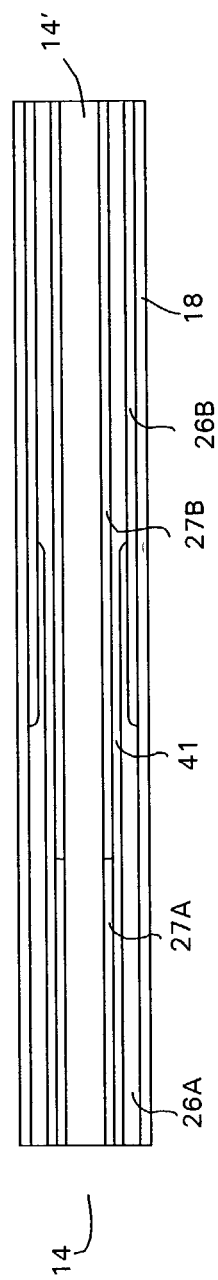
Figure 7C:
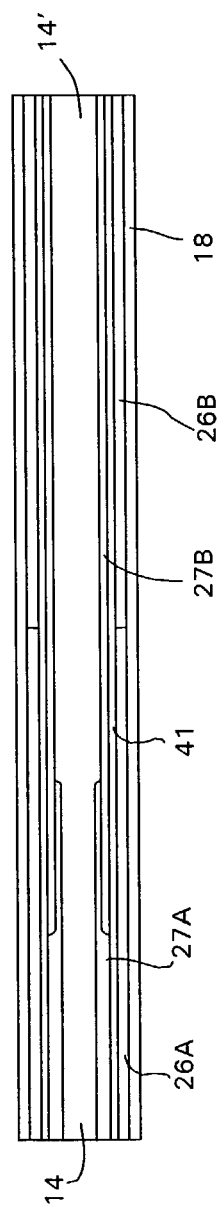
Figure 8C:
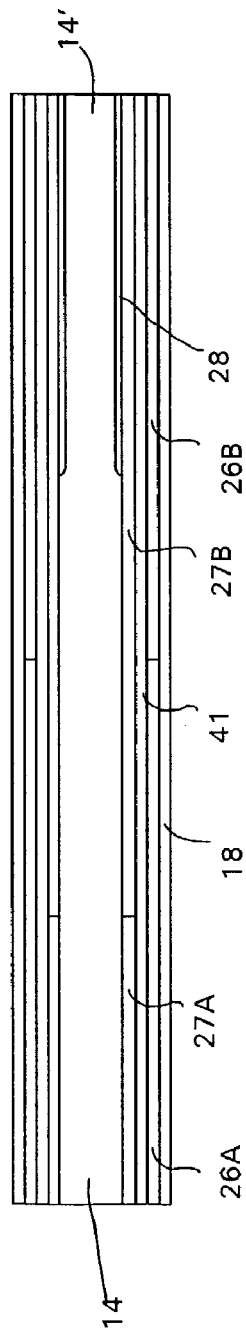

In yet another variation of Design A1, each of the internal surfaces of the first and second group of passages in Design A1 is provided with a barrier layer, in addition to the trap layer and catalytic layer(s). FIGS. 7A–C, for example, show certain embodiments of this variation of Design A1 for the first group of passages in a sectional view of a single passage. The barrier layer (41), which has a similar composition to the undercoat composition described above, is typically formed from a washcoat composed of base metal components, is interposed between the trap layer (26) of the substrate and the first catalytic layer (27). The undercoat preferably extends from the inlet end to the outlet end of the substrate so that it can serve, among other things, as a barrier to prevent migration of components between the catalytic layer and the trap layer. FIG. 8C shows a sectional view of a single passage for a passage of the second group of passages having an undercoat.

In another coating design alternative for the catalyst, designated as "Design A2" the substrate is coated with the same washcoat compositions of Design A1, except that in this alternative, all of the passages have the coating design of the above-described second group of passages. FIG. 2, for example, shows a cross-sectional view of one embodiment of a catalyst substrate having the design alternative of Design A2. When all of the passages of the substrate have the coating design of the above-described second group of passages (e.g., FIG. 8), the resulting coating design defines a plurality of axial zones. Here again, a downstream burn-off zone is defined with enhanced hydrocarbon and NOx conversion activity, but in Design A2 the second catalytic layer is present in substantially all of the passages of the substrate. In Design A1, fewer passages throughout the radius of the substrate have the second catalytic layer.

In embodiments of Catalyst A where the passages have an undercoat, the undercoat can serve to prevent migration of alkali metal and alkaline earth metal components that degrade the structural integrity of the substrate. Alkali metal and alkaline earth metal components e.g., potassium components, can slowly migrate from he trap or catalytic layer and can degrade cordierite substrates. The degradation of the substrate, in turn, ultimately has an adverse effect on the performance of the catalyst.

An additional advantage of coating the substrate with the undercoat is that it provides an improved coating surface for certain commonly used substrates. For substrates containing internal passages with a rectangular or square shape, the undercoat effectively rounds off the corners thus creating a more effective coating surface for subsequent layers, such as catalytic layers containing platinum group metals. Specifically, the rounded corners provided by the undercoat, prevent the catalyst washcoat from being deposited in the corners of the passages where the platinum group metal is less accessible to the exhaust gas. Due to the increased accessibility of the catalytic layer to the exhaust gas, a thinner washcoat of the catalytic layer can be used in the catalyst without sacrificing catalyst performance. This feature significantly reduces platinum group metal use and cost without sacrificing performance.

In embodiments of Catalyst A where the passages have a barrier layer, the barrier layer can serve to prevent migration of components between the trap layer and the catalytic layer(s). Migration of components into the trap layer may degrade the adsorbent capacity of the trap layer over time. Alternatively, migration of components into the catalytic layer(s) may eventually degrade the catalytic activity of the catalytic layer(s). Thus, the barrier can serve to extend the operational lifetime of the catalyst.

Both the undercoat and the barrier layers are formed from washcoat compositions that contain refractory inorganic oxides such as alumina, zirconia, ceria and composite materials thereof. In addition to refractory inorganic oxides the undercoat and barrier composition can also contain sulfide suppressants such as a nickel or iron component. Generally, the undercoat is deposited on the internal surfaces of the substrate to a thickness of about 0.3 g/in$^3$ to 2.0 g/in$^3$, and preferably is deposited to a thickness of 0.5 g/in$^3$ to 1.8 g/in$^3$. Similarly, the barrier layer (disposed on the trap layer) has a thickness of 0.3 g/in$^3$ to 2.0 g/in$^3$, and preferably has a thickness of 0.5 g/in$^3$ to 1.8 g/in$^3$.

Each of the catalytic layers (including segments) on the monolith substrates are formed from catalytic washcoat compositions that typically contain catalytic agents which comprise one or more platinum group metal components located upon a high surface area, refractory oxide support, e.g., a high surface area alumina coating. Other additives such as oxygen storage components (e.g., rare earth metal oxides), binders, sulfide suppressants, stabilizers and promoters can be included in the composition. When the compositions are applied as a thin coating to a monolithic substrate, the proportions of ingredients are conventionally expressed as grams of material per cubic inch of coated substrate (i.e., the volume of the substrate that is coated with the indicated composition and not necessarily the total substrate volume) as this measure accommodates different gas flow passage cell sizes in different monolithic substrates. In the case of platinum group metal components, the proportions of these components deposited are also commonly expressed as grams of material per cubic foot of coated substrate. Weight of the platinum group metal components recited below in preferred catalysts are based on the weight of the metal.

While a number of coating compositions can be used to form the first inlet and outlet catalytic segments of Catalyst A, it is preferred that each-of these segments contain at least one platinum component and at least one rhodium component. Preferably, the inlet catalytic segments contain an inlet platinum component in a concentration of about 12.5 g/ft$^3$ to 200 g/ft$^3$, and more preferably in a concentration of 25 g/ft$^3$ to 125 g/ft$^3$. The outlet catalytic segment contains the outlet platinum component in a concentration of 12.5 g/ft$^3$ to 100 g/ft$^3$, and more preferably in a concentration of about 12.5 to 25 g/in$^3$. Preferably, each of the inlet and outlet catalytic segments contain the rhodium component in a concentration of 2.5 g/ft$^3$ to about 25 g/ft$^3$, and more preferably in a concentration of 10 to 25 g/ft$^3$.

Useful catalytic supports in the first and second catalytic layers of Catalyst A can be the same or different, and include one or more refractory oxides selected from alumina, titania, silica and zirconia. Preferred catalyst supports can be activated compounds selected from the group consisting of alumina, silica, silica-alumina, alumino-silicates (which may be amorphous or crystalline), alumina-zirconia, alumina-chromia, and alumina-rare earth metal oxides (e.g., alumina-ceria). The support is preferably substantially comprised of alumina which preferably includes the members of the gamma or activated alumina family, such as gamma and eta aluminas, and, if present, a minor amount of other refractory oxide, e.g., about up to 20 weight percent. Preferably, the activated alumina has a specific surface area of 60 to 300 m$^2$/g.

Each of the inlet and outlet catalytic segments for Catalyst A are preferably formed from washcoats that contain an oxygen storage component. The oxygen storage component is any such material known in the art and preferably at least one oxide selected from the the group of rare earth metals and most preferably a cerium or praseodymium compound with the most preferred oxygen storage component being cerium oxide (ceria). Ceria and other oxygen storage components are commonly included in automotive catalyst compositions to store oxygen when air/fuel (A/F) ratios are lean of stoichiometric so-that oxygen can be released when A/F ratios in the exhaust become rich to combust the unburned hydrocarbons and carbon monoxide.

The oxygen storage component can be included in the washcoat composition by impregnating the oxygen storage component on the catalyst support components, e.g., alumina. In addition or alternatively, the oxygen storage components are provided in outlet oxygen storage compositions that are in bulk form. By bulk form it is meant that the composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. Nos. 4,714,694 and 5,057,483, both hereby incorporated by reference.

In a preferred embodiment, the inlet and outlet catalytic segments contain a diluted outlet oxygen storage composition. The oxygen storage composition contains a diluent in addition to the oxygen storage component. Useful and preferred diluents include refractory oxides. Diluent is used to mean that the outlet oxygen storage component is present in the oxygen storage composition in relatively minor amounts. The composition is a mixture which can be characterized as a composite which may or may not be a true solid solution. The oxygen storage component is diluted to minimize interaction with the rhodium component. Such interaction may reduce long term catalytic activity. The inlet and outlet catalytic segments preferably contain an oxygen storage composition having an outlet oxygen storage component such as rare earth metal oxide, preferably ceria. The outlet oxygen storage component is diluted with a diluent such as a refractory metal oxide, preferably zirconia. A particularly preferred oxygen storage composition is a co-precipitated ceria/zirconia composite. There is preferably up to 30 weight percent ceria and at least 70 weight percent zirconia. Preferably, the oxygen storage composition comprises ceria, and one or more of lanthana, neodymia, praseodymia, yttria or mixtures thereof in addition to ceria. A particularly preferred particulate composite comprises ceria, neodymia and zirconia. Preferably, there is from 30 to 90 wt. % zirconia, 10–90% wt. % ceria, 0 and up to 10 wt. % neodymia. Optionally, the composite can additionally contain up to 20 wt. % lanthana and up to 50 wt. % praseodymia. In addition to its oxygen storage capacity, the ceria stabilizes the zirconia by preventing it from undergoing undesirable phase transformation.

Zirconium components, preferably zirconia, are typically included in the inlet and/or outlet catalytic segments and act as both stabilizers and promoters. Typically, there is from about 0.03 g/in$^3$ to 0.15 g/in$^3$ of zirconium oxide in each of the inlet and outlet catalytic segments.

Optionally, stabilizers can be included in either the inlet or outlet catalytic segments. As disclosed in U.S. Pat. No. 4,727,052, support materials, such as activated alumina, can be thermally stabilized to retard undesirable alumina phase transformations from gamma to alpha at elevated temperatures. Stabilizers can be selected from at least one alkaline earth metal component selected from the group consisting of magnesium, barium, calcium and strontium, preferably strontium and barium.

The second catalytic layer in Catalyst A contains a platinum group metal component preferably selected from rhodium and/or platinum components which are supported on a refractory inorganic oxide support, preferably alumina. In a preferred embodiment of Catalyst A, the second catalytic layer comprises a rhodium component. The second catalytic layer contains the platinum group metal components in a concentration of about 12.5 g/ft$^3$ to 100 g/ft$^3$, and more preferably in a concentration of 20 g/ft$^3$ to 55 g/ft$^3$. Optionally, the second catalytic layer can contain an oxygen storage component, which can be in the form of a diluted oxygen storage composition.

The hydrocarbon adsorbent material used in Catalyst A can include any known hydrocarbon adsorbent that can be formed into a washcoat composition. A preferred hydrocarbon trap segment can be formed from a washcoat containing hydrocarbon adsorbent materials as described in U.S. Pat. No. 6,171,556 ("the '556 patent"), hereby incorporated by reference. As disclosed therein, zeolites, and particularly, Beta zeolites are particularly effective adsorbents, especially those having high silica/alumina ratio ranges of about 25/1 to 300/1, and from about 100/1 to about 250/1. The zeolites, preferably Beta zeolites may have a silica/alumina molar ratio of from at least about 25/1, preferably at least about 50/1, with useful ranges of from about 25/1 to 1000/1, 50/1 to 500/1, as well as about 25/1 to 300/1 for example, from about 100/1 to 250/1, or alternatively from about 35/1 to 180/1. Other useful and preferred silica to alumina molar ratios for zeolites are at least 200/1 with more preferred ratios of from about 200/1 to about 1000/1, and Beta zeolite ratio ranges preferably from about 200/1 to about 600/1. The preferred Beta zeolites are ion-exchanged Beta zeolites, such as H/Beta zeolite and Fe/Beta zeolite. Preferred zeolites also have a low relative Bronsted acidity.

The number of acid sites of the preferred zeolites can be reduced by leaching the zeolite with an organic or inorganic acid, e.g., sulfuric acid as disclosed in the '556 patent. Alternatively, or additionally, the zeolite can be steam treated with steam at from 350 to 900° C. The steam temperature can be increased at a suitable rate such as from 100 to 600° C. per hour. Steam treated zeolites have been found to increase the durability of zeolites when used to adsorb hydrocarbons in gaseous streams and to resist coke formation. Preferably, the zeolite can be treated with both leaching and steam treatment. In a particularly preferred process, the zeolite is first acid leached followed by steam treatment. Optionally, the steps of steam treatment and steaming can be repeated in any desired order. For example, leached and steamed zeolite can be repeatedly leached followed by steaming. In a specific embodiment the zeolite can be leached, steamed and leached again.

A useful method to treat Beta zeolite is disclosed, for example in CN 1059701A, published Mar. 25, 1992 and herein incorporated by reference. This reference discloses a high Si Beta zeolite produced by calcining to remove nitrogen compounds from a Beta zeolite made through an organo-amine template process. Leaching the Beta zeolite is accomplished with an organic or inorganic acid solution having a concentration of 0.02 to 12N, preferably 0.1 to 10N, and a solid zeolite concentration of 0.01 to 1.0 g/ml and preferably 0.05 to 0.5 g/ml at from 10 to 100° C. for 0.5 to 5 hours, and preferably 1 to 3 hours. The leaching is followed by treating the zeolite with steam at from 400 to 900° C. with the steam temperature increasing at from 100 to 600° C. per hour. Disclosed steam concentration is 100% at a system pressure of 50 to 500 KPa. The duration of the steam treatment is from 0.5 to 5 hours.

A zeolite with relatively less Bronsted acid sites than a comparable zeolite having the same silica to alumina ratio, even considering only the silica to alumina ratio in the zeolite framework will result in a more stable (to coke formation) adsorbent material to hydrocarbons in an exhaust steam. It has been found that while the overall acidity, and the silica to alumina ratio may be an important indicators of adsorbent properties, the relative Bronsted activity is also significant.

A zeolite with reduced Bronsted acidity can be made by suitable means, with a preferred method to reduce Bronsted acid sites being steam treatment as recited above. A typical Bronsted acid structure is:

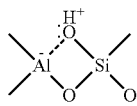

The NOx trap segment can be formed from nitrogen oxides adsorbent materials such as those disclosed in U.S. patent application Ser. No. 6,105,365 ("the '365 patent"), hereby incorporated by reference. This reference discloses use of suitable NOx adsorption materials that include but are not limited to metal oxides, metal carbonates, metal hydroxides, and mixed metal oxides.

Suitable metals for the oxides, carbonates, and hydroxides include but are not limited to alkali and alkaline earth metals. As used herein, "alkali metals" include lithium, sodium, potassium and cesium; and "alkaline earth metals" include magnesium, calcium, strontium and barium.

Preferred metals for NOx adsorption materials are lithium, sodium, potassium, cesium, magnesium, calcium, strontium, and barium; most preferred are lithium, barium, and strontium. Other preferred metals are lanthanum and manganese.

Examples of useful metal oxides for the NOx adsorbent material are strontium oxide (SrO), barium oxide (BaO), calcium oxide (CaO), cesium-oxide ($Cs_2O$), lithium oxide (LiO), lanthanum oxide ($La_2O_3$), potassium oxide ($K_2O$), magnesium oxide (MgO), manganese oxide ($MnO_2$), and sodium oxide ($Na_2O$). Preferred are $MnO_2$, BaO and SrO.

Examples of useful mixed oxides are $BaTiO_3$, $BaZrO_3$, $LaZrO_2$, MnO, $LaMnO_{x'}$ (where x' is an integer from 2 to 4) and perovskite and spinal type mixed oxides. Also useful are mixed oxides containing $La_2O_3$, $CeO_2$ with metal oxides such as $TiO_2$, $ZrO_2$, $MnO_2$, BaO, and SrO. Preferred mixed oxides are those containing $ZrO_2$, $MnO_2$, BaO, and SrO.

The adsorption capabilities of the foregoing NOx adsorbent materials can be enhanced for certain pollutants by incorporating an adsorption enhancing amount of certain metals such as platinum group metals. A preferred metal is platinum.

The adsorption enhancing amount of the platinum group metal is any amount that can enhance or promote adsorption of the NOx on the adsorbent material. Typically, such amounts range from 2.5 to 150 $g/ft^3$, preferably from 2.5 to 25 $g/ft^3$.

Suitable platinum group metals for incorporation into NOx trap segments include but are not limited to platinum, palladium, rhodium and combinations thereof. Preferred are platinum, palladium, platinum/palladium mixtures and platinum/palladium/rhodium.

Typically, the above-described NOx adsorbent materials and platinum group metals are impregnated onto a suitable refractory oxide support, e.g., activated alumina, and formed into a washcoat slurry for deposition on the interior walls of the substrate (or on the undercoat).

Below are described useful and preferred embodiments for the first and second catalytic layers, the undercoat and the trap layer for Catalyst A.

A useful and preferred inlet catalytic segment for the catalyst has:
  from about 12.5 $g/ft^3$ to about 200 $g/ft^3$ of an inlet platinum component;
  from about 2.5 $g/ft^3$ to about 25 $g/ft^3$ of an inlet rhodium component;
  from about 0.2 $g/in^3$ to about 1.0 $g/in^3$ of an inlet alumina support;
  from about 0.2 $g/in^3$ to about 1.0 $g/in^3$ of inlet rare earth metal oxide-zirconia composite (particularly ceria-zirconia composite); and
  from about 0.03 $g/in^3$ to about 0.15 $g/in^3$ of an inlet zirconium component.

A useful and preferred outlet catalytic segment for the catalyst has:
  from about 12.5 $g/ft^3$ to about 100 $g/ft^3$ of an outlet platinum component;
  from about 2.5 $g/ft^3$ to about 25 $g/ft^3$ of an outlet rhodium component;
  from about 0.2 $g/in^3$ to about 1.0 $g/in^3$ of an outlet alumina support;
  from about 0.2 $g/in^3$ to about 1.0 $g/in^3$ of outlet rare earth metal oxide-zirconia composite (particularly ceria-zirconia composite); and
  from about 0.03 $g/in^3$ to about 0.15 $g/in^3$ of an outlet zirconium component.

A useful and preferred second catalytic layer for the catalyst has:
  from about 12.5 $g/ft^3$ to about 100 $g/ft^3$ of second rhodium component;
  from about 0.2 $g/in^3$ to about 1.0 $g/in^3$ of a second alumina support;
  from about 0.03 $g/in^3$ to about 0.15 $g/in^3$ of a second zirconium component; and
  from about 0.2 $g/in^3$ to about 1.0 $g/in^3$ of a second rare earth metal oxide-zirconia composite (particularly a ceria-zirconia composite).

A useful and preferred hydrocarbon trap segment for the catalyst has:
  from about 0.1 $g/in^3$ to about 1.2 $g/in^3$ of a hydrocarbon trap zeolite material (preferably, a Beta zeolite); and
  from about 0.05 $g/in^3$ to about 0.2 $g/in^3$ of a hydrocarbon trap zirconium component.

A useful and preferred NOx trap segment for the catalyst has:
  from about 5 $g/ft^3$ to about 25 $g/ft^3$ of a NOx trap platinum component;
  from about 0.2 $g/in^3$ to about 1.5 $g/in^3$ of a NOx trap alumina support;
  from about 0.1 $gin^3$ to about 0.5 $g/in^3$ of a NOx trap rare earth metal oxide-zirconia composite (particularly ceria-zirconia composite);
  from about 0.05 $g/in^3$ to about 0.2 $g/in^3$ of a NOx trap zirconium component;
  from about 0.05 $g/in^3$ to about 0.3 $g/in^3$ of a NOx trap potassium component;
  from about 0.05 $g/in^3$ to about 0.3 $g/in^3$ of a NOx trap manganese component; and
  from about 0.05 $g/in^3$ to about 0.3 $g/in^3$ of a NOx trap barium component.

Catalyst A optionally contains an undercoat (e.g., coating designs of FIGS. 6A–C, 8B). A useful and preferred undercoat for the catalyst has:

from about 0.5 g/in³ to about 1.5 g/in³ of an undercoat alumina support;

from about 0.05 g/in³ to about 0.15 g/in³ of an undercoat zirconium component; and from about 0.0 g/in³ to about 0.5 g/in³ of an undercoat nickel component.

Catalyst A optionally contains a barrier layer (e.g., coating designs of FIGS. 7A–C, 8C). A useful and preferred barrier layer for the catalyst has:

from about 0.5 g/in³ to about 1.5 g/in³ of a barrier alumina support;

from about 0.05 g/in³ to about 0.15 g/in³ of a barrier zirconium component; and from about 0.0 g/in³ to about 0.5 g/in³ of a barrier nickel component.

Exhaust Gas Treatment Systems

Figure 9:
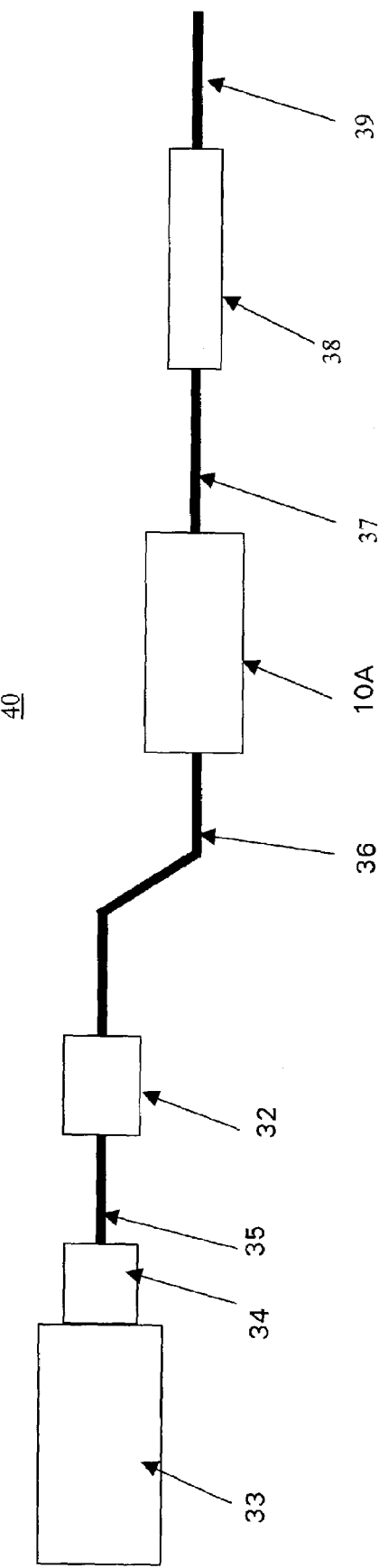
FIG. 9 is a drawing depicting an exhaust gas treatment system.

Another embodiment of the invention relates to an exhaust gas treatment system having at least two catalyst substrates. One preferred embodiment of the invention is depicted in FIG. 9. A motor vehicle exhaust line (40) includes an upstream catalyst (32) and a downstream catalyst (10A). FIG. 10 also includes a gasoline engine (33) and an engine exhaust manifold (34) connected through an upstream conduit (35) with the upstream catalyst. A downstream conduit (36) connected to the upstream catalyst leads to the downstream catalyst (10A). The downstream catalyst is typically and preferably connected to a muffler (38) through underfloor exhaust pipe (37). The muffler is connected to a tail pipe (39) having a tail pipe outlet which opens to the environment. The downstream catalyst in the exhaust system is Catalyst A.

The coating designs (e.g., FIGS. 5A–C, 6A–C, 7A–C and 8A–C) and coating compositions for Catalyst A are identical to those described above, when Catalyst A is integrated into an exhaust gas treatment system. For clarity, the components (e.g., platinum group metal components) and layers are recited below as "downstream" components and "downstream" layers for an exhaust system integrating Catalyst A as a downstream catalyst substrate with at least one upstream catalyst substrate.

A useful and preferred embodiment of the exhaust gas treatment system has a downstream catalyst substrate (Catalyst A) having a downstream inlet catalytic segment with:

from about 12.5 g/ft³ to about 200 g/ft³ of a downstream inlet platinum component;

from about 2.5 g/ft³ to about 25 g/ft³ of a downstream inlet rhodium component;

from about 0.2 g/in³ to about 1.0 g/in³ of a downstream inlet alumina support;

from about 0.2 g/in³ to about 1.0 g/in³ of a downstream rare earth metal oxide-zirconia composite (particularly ceria-zirconia composite); and from about 0.03 g/in³ to about 0.15 g/in³ of a downstream inlet zirconium component.

A useful and preferred outlet catalytic segment for the downstream catalyst has:

from about 12.5 g/ft³ to about 100 g/ft³ of a downstream outlet platinum component;

from about 2.5 g/ft³ to about 25 g/ft³ of a downstream outlet rhodium component;

from about 0.2 g/in³ to about 1.0 g/in³ of a downstream outlet alumina support;

from about 0.2 g/in³ to about 1.0 g/in³ of a downstream outlet rare earth metal oxide-zirconia composite (particularly a ceria-zirconia composite); and from about 0.03 g/in³ to about 0.15 g/in³ of a downstream outlet zirconium component.

A useful and preferred downstream second catalytic layer for the downstream catalyst has:

from about 12.5 g/ft³ to about 100 g/ft³ of a downstream second rhodium component;

from about 0.2 g/in³ to about 1.0 g/in³ of a downstream second alumina support;

from about 0.03 g/in³ to about 0.15 g/in³ of a downstream second zirconium component; and from about 0.2 g/in³ to about 1.0 g/in³ of a downstream second rare earth metal oxide-zirconia composite (particularly a ceria-zirconia composite).

A useful and preferred hydrocarbon trap segment for the downstream catalyst has:

from about 0.1 g/in³ to about 1.2 g/in³ of a hydrocarbon trap zeolite material (preferably, Beta zeolite material); and from about 0.05 g/in³ to about 0.2 g/in³ of hydrocarbon trap zirconium component.

A useful and preferred NOx trap segment for the downstream catalyst has:

from about 5 g/ft³ to about 25 g/ft³ of a NOx trap platinum component;

from about 0.2 g/in³ to about 1.5 g/in³ of a NOx trap alumina support;

from about 0.1 g/in³ to about 0.5 g/in³ of a NOx trap rare earth metal oxide-zirconia composite (particularly ceria-zirconia composite);

from about 0.05 g/in³ to about 0.2 g/in³ of a NOx trap zirconium component;

from about 0.05 g/in³ to about 0.3 g/in³ of a NOx trap potassium component;

from about 0.05 g/in³ to about 0.3 g/in³ of a NOx trap manganese component;

from about 0.05 g/in³ to about 0.3 g/in³ of a NOx trap barium component;

The downstream catalyst optionally contains a downstream undercoat (e.g., coating designs of FIGS. 6A–C, 8B). Where present, a useful and preferred downstream undercoat for the downstream catalyst has:

from about 0.5 g/in³ to about 1.5 g/in³ of a downstream undercoat alumina support;

from about 0.05 g/in³ to about 0.15 g/in³ of a downstream undercoat zirconium component; and from about 0 W/in³ to about 0.5 g/in³ of a downstream undercoat nickel component.

The downstream catalyst optionally contains a downstream barrier layer (e.g., coating designs of FIGS. 7A–C, 8C). A useful and preferred downstream barrier layer for the catalyst has:

from about 0.5 g/in³ to about 1.5 g/in³ of a downstream barrier alumina support;

from about 0.05 g/in³ to about 0.15 g/in³ of a downstream barrier zirconium component; and from about 0.0 g/in³ to about 0.5 g/in³ of a downstream barrier nickel component.

When incorporated into exhaust systems having at least two catalyst substrates, Catalyst A is preferably incorporated downstream of at least one catalyst substrate in the exhaust system. This upstream catalyst has the capability of withstanding high engine exhaust temperatures, and can also convert hydrocarbons during cold starts at a very high degree of efficiency (i.e., the upstream catalyst has an excellent light-off capacity). Preferably, the catalyst is effective at conducting three-way-conversion (i.e., of hydrocarbon, carbon monoxide and nitrogen oxides) during warmed up high temperature operation.

In one preferred embodiment, Catalyst A is integrated into an exhaust system that is downstream of another catalyst substrate, an upstream catalyst substrate, designated herein as "Catalyst B". Catalyst B is particularly effective at converting hydrocarbons, and to a lesser degree carbon monoxide and nitrogen oxides to innocuous exhaust components. Catalyst B has a honeycomb monolith substrate (10) having internal surfaces coated with upstream first catalytic layer (29) and an upstream second catalytic layer (31) as depicted in a sectional view of a single internal passage of a monolith substrate in FIG. 10A. The upstream first catalytic layer comprises an upstream first inlet catalytic segment (29A) and an upstream first outlet catalytic segment (29B). The upstream first inlet catalytic segment (29A) is coated on the internal surfaces of the upstream substrate (18) from the upstream inlet axial end (14) to a length that is less than the axial length of the upstream substrate. The upstream first outlet catalytic segment (29B) is coated from the upstream outlet axial end (14') of the substrate to a length that is less than the length of the upstream substrate. In the embodiment depicted in FIG. 10A, the upstream first outlet catalytic segment (29B) is disposed in part on the internal surfaces of the upstream substrate (18) and in part on the upstream first inlet catalytic segment (29A). The lengths of the upstream first inlet and upstream outlet catalytic segments can be the same or different, so long as at least part of the upstream first inlet and upstream outlet catalytic segment overlap along an intermediate portion of the upstream substrate. An upstream second catalytic layer (31) is coated on the upstream first inlet catalytic layer along a short length at the upstream inlet end of the upstream substrate.

In a preferred coating design for Catalyst B depicted in FIG. 10A, the overlapping coating architecture defines three catalyst zones along the axis of the substrate: an upstream zone (20A) wherein the substrate is coated with the upstream first inlet catalytic segment and upstream second catalytic layer; an intermediate zone (24A) wherein the upstream substrate is coated with the upstream first inlet catalytic segment and the upstream first outlet catalytic segment along the length of the zone; and a downstream zone (22A) wherein the substrate is coated with only the upstream first outlet catalytic segment. In this embodiment, an exhaust gas flowing along the axial length of the substrate would first pass through the upstream zone, then through the intermediate zone and finally through the downstream zone.

In the preferred coating design depicted in FIG. 10A, the upstream catalyst has an upstream zone (20A) wherein low temperature hydrocarbon performance (e.g., below about 300° C.) is emphasized, while the intermediate (24A) and downstream zones (22A) emphasize other catalyst functions such as carbon monoxide/nitrogen oxides treatment. In this configuration, the upstream zone (also referred to as a "light off zone") not only provides enhanced hydrocarbon performance at lower temperatures, but the heat generated from the combustion of the hydrocarbons also serves to heat the other zones of the Catalyst B to higher temperatures where other catalytic reactions such as carbon monoxide oxidation and nitrogen oxides reduction are optimized.

In one preferred embodiment of Catalyst B, the upstream first inlet and upstream outlet layers each extend to a length of at least 60% of the upstream substrate's axial length. The upstream second catalytic layer has a length of less than 50% of the upstream substrate's axial length. More preferably, the length of the upstream second catalytic layer is about 30–40% of upstream substrate's axial length.

In an alternative embodiment of Catalyst B depicted in FIG. 10B, an upstream undercoat (25) is interposed between the upstream first catalytic layer and the internal passages (18) of the upstream substrate. As described above for Catalyst A, the upstream undercoat can serve to prevent the degradation of the substrate, as well as to improve the coating surface for many commonly used substrates.

Catalyst B contains three different platinum group metal components; a platinum component, a palladium component and a rhodium component. The upstream first inlet catalytic segment (29A) contains either an upstream first inlet palladium component or a combination of upstream first inlet palladium and upstream first inlet platinum components. Preferably, the upstream first inlet platinum group metal components in the upstream first inlet layer are deposited in at least 80 g/ft$^3$ to ensure adequate hydrocarbon combustion at lower temperature. The upstream first outlet catalytic segment (29B) contains an upstream first outlet rhodium component and an upstream first outlet platinum component. Preferably in this configuration, the upstream first outlet catalytic segment overlies the upstream first inlet catalytic segment.

In Catalyst B, the upstream first inlet catalytic segment is formed from a composition that contains at least one upstream first inlet palladium component, and optionally contains minor amounts of a platinum or rhodium component based on the total platinum or rhodium metal of the platinum and rhodium components in the upstream first inlet and upstream outlet catalytic segments. The upstream first outlet catalytic segment composition contains at least two-upstream first outlet platinum group metal components with one of the platinum group metal components preferably being a platinum component and the other preferably being a rhodium component. The washcoats used to form the upstream first inlet and upstream catalytic segments in Catalyst B are similar in composition to certain washcoats disclosed in WO 95/35152, which is hereby incorporated by reference.

Platinum group component support components in the upstream first inlet and upstream outlet catalytic segments of Catalyst B can be the same or different, and are preferably compounds selected from the group consisting of silica, alumina and titania compounds. Preferred upstream first inlet and upstream first outlet supports can be activated compounds selected from the group consisting of alumina, silica, silica-alumina, alumino-silicates, alumina-zirconia, alumina-chromia, and alumina-rare earth metal oxides (e.g., alumina-ceria).

A specific and preferred embodiment of Catalyst B relates to a layered catalyst composite having an upstream first inlet catalytic segment which comprises an upstream first inlet support having at least one upstream first inlet palladium component and from 0 to less than fifty weight percent of an upstream first inlet platinum component based on the total amount of platinum metal in the upstream inlet and upstream outlet catalytic segments. Preferably, the upstream first inlet catalytic segment (29A) also contains an upstream first inlet support, at least one upstream first alkaline earth metal as a stabilizer, an upstream first inlet zirconium component and an upstream first inlet oxygen storage composition which preferably contains a diluted oxygen storage component such as a rare earth metal oxide-zirconia composite as described above for Catalyst A. Optionally, the upstream first inlet catalytic segment can also contains an upstream first inlet rare earth metal oxide which is preferably selected from the group consisting of lanthanum metal components and neodymium metal components.

The upstream first outlet catalytic segment preferably comprises an upstream first outlet support, at least one upstream first outlet platinum component, at least one upstream first outlet rhodium component, and an upstream first outlet oxygen storage composition which preferably contains a diluted oxygen storage component such as a rare earth metal oxide-zirconia composite as described above for Catalyst A. There can be from fifty to one hundred weight percent based on platinum metal of the upstream first outlet platinum component based on the total amount of platinum metal in the upstream first inlet and upstream first outlet segments. In addition, the upstream first outlet catalytic segment preferably comprises at least one upstream first outlet alkaline earth metal oxide as a stabilizer, and an upstream first outlet zirconium component. Optionally, the upstream first outlet catalytic segment can contain an upstream first outlet rare earth metal oxide which is preferably selected from the group consisting of lanthanum metal components and neodymium metal components.

The upstream second catalytic layer (31) is formed from a low viscosity catalyst washcoat containing palladium or a combination of palladium/platinum components. An upstream second palladium component and optionally a upstream second inlet platinum component are supported on an upstream second support, e.g., alumina. In preferred embodiments there is at least 80 g/ft$^3$ of platinum group metal component in the upstream second layer.

The upstream undercoat in Catalyst B is formed from washcoat compositions that are as described above for Catalyst A. The upstream undercoat layer is formed from washcoat compositions that contain refractory inorganic oxides such as alumina, zirconia, ceria and composite materials thereof. In addition to refractory inorganic oxides the upstream undercoat can also contain sulfide suppressants such as a nickel or iron component. Generally, the upstream undercoat is deposited on the internal surfaces of the upstream substrate to a thickness of about 0.3 g/in$^3$ to 2.0 g/in$^3$, and preferably, to a thickness of 0.5 g/in$^3$ to 1.8 g/in$^3$.

In Catalyst B, a useful and preferred upstream first inlet catalytic segment has (recited as grams per coated substrate volume):
  from about 30 to about 520 g/ft$^3$ of an upstream first inlet palladium component;
  optionally from about 2 to about 112 g/ft$^3$ of an upstream first inlet platinum component;
  from about 0.15 to about 2.0 g/in$^3$ of an upstream first inlet support;
  from about 0.025 to about 0.5 g/in$^3$ of at least one upstream first inlet alkaline earth metal component;
  from about 0.025 to about 0.5 g/in$^3$ of an upstream first inlet zirconium component; and
  from about 0.2 g/in$^3$ to about 1.0 g/in$^3$ of an upstream first inlet rare earth metal oxide-zirconia composite (particularly ceria-zirconia composite).

In Catalyst B, a useful and preferred upstream first outlet catalytic segment has:
  from about 2 g/ft$^3$ to about 52 g/ft$^3$ of an upstream first outlet rhodium component;
  from about 2 g/in$^3$ to about 260 g/in$^3$ of an upstream first outlet platinum component;
  from about 0.15 g/in$^3$ to about 1.5 g/in$^3$ of an upstream first outlet support;
  from about 0.1 to 2.0 g/in$^3$ of an upstream first outlet oxygen storage composition;
  from about 0.2 g/in$^3$ to about 2.0 g/in$^3$ of an upstream first outlet rare earth metal oxide-zirconia composite (particularly ceria-zirconia composite); and
  from about 0.025 to about 0.5 g/in$^3$ of an upstream first outlet zirconium component.

In Catalyst B, a useful and preferred upstream second catalytic layer has:
  from about 50 to about 350 g/ft$^3$ of upstream second palladium component; and
  from about 0.1 to about 1.5 g/in$^3$, and more preferably about 0.1 to 0.7 g/in$^3$ of an upstream second support.

Optionally, Catalyst B can further include an upstream undercoat (e.g., coating design of FIG. 10B) that has:
  from about 0.5 g/in$^3$ to about 1.5 g/in$^3$ of a upstream undercoat alumina support;
  from about 0.05 g/in$^3$ to about 0.15 g/in$^3$ of a upstream undercoat zirconium component; and
  from about 0 g/in$^3$ to about 0.5 g/in$^3$ of a downstream upstream nickel component.

Preparation of Washcoats and Substrate Coating Preparations

As used herein, the term "platinum group metal component" means any platinum group metal compound, complex, or the like, which upon calcination or use of the catalyst decomposes or otherwise converts to a catalytically active form, usually the metal or the metal oxide. In a preferred method of preparing the catalyst, a platinum group metal component such as a suitable compound and/or complex of the platinum group metals can be utilized to achieve dispersion of the catalytic component on a support, e.g., activated alumina support particles. Water soluble compounds or water dispersible compounds or complexes of platinum group metals can be utilized to impregnate or deposit the catalytic metal compounds onto support particles. The platinum group metal component decomposes upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds of the platinum group metals are preferred. For example, suitable compounds are chloroplatinic acid, amine solubilized platinum hydroxide, palladium nitrate or palladium chloride, rhodium chloride, rhodium nitrate, hexamine rhodium chloride, and the like. During the calcination step, or at least during the initial phase of use of the catalyst, such compounds are converted into a catalytically active form of the platinum group metal or an oxide thereof.

The oxygen storage component can be included in the catalyst washcoats by dispersing methods known in the art. One method includes impregnation onto the composition by impregnating the oxygen storage component onto the support such as a platinum group metal containing support in the form of an aqueous solution, drying and calcining the resulting mixture in air to give a catalyst layer that contains an oxide of the oxygen storage component in intimate contact with the catalytic agent. Examples of water soluble or dispersible, decomposable oxygen storage components that can be used include, but are not limited to water soluble salts and/or colloidal dispersions of cerium acetate, praseodymium acetate, cerium nitrate, praseodymium nitrate, etc. U.S. Pat. No. 4,189,404, for example, discloses the impregnation of alumina-based support composition with cerium nitrate.

In another method, the oxygen storage component in the first catalytic washcoat composition (including the inlet and outlet catalytic segments) is a bulk oxygen storage composition composed of an oxygen storage component which is preferably ceria, and/or praseodymia in bulk form. Ceria is most preferred. A preferred bulk oxygen storage component includes a co-precipitated ceria-zirconia composite.

Additionally, the catalyst washcoat composition can contain a compound derived from zirconium, preferably zirconium oxide. The zirconium compound can be provided as a water soluble compound such as zirconium acetate or as a relatively insoluble compound such as zirconium hydroxide, both of which upon calcining are converted to the oxide. There should be an amount sufficient to enhance the stabilization and promotion of the catalyst washcoat compositions.

Stabilizers can be included in the catalyst washcoat compositions. Stabilizers can be selected from at least one alkaline earth metal component derived from a metal selected from the group consisting of magnesium, barium, calcium and strontium, preferably strontium and barium. The alkaline earth metal can be applied in a soluble form (i.e., as a water-soluble salt) which upon calcining becomes the oxide.

The catalyst washcoat compositions optionally contain at least one promoter selected from the group consisting of lanthanum metal components and neodymium metal components with the preferred components being lanthanum oxide (lanthana) and neodymium oxide (neodymia).

The lanthanum and/or neodymium components are preferably formed from precursors, such as soluble salts including acetates, halides, nitrates, sulfates and the like. The solution of the soluble promoters are preferably used to impregnate the solid components for their conversion to oxides after calcination. Preferably, the promoter is in intimate contact with other components in the composition including, and in particular, the platinum group metal component.

The catalyst layer compositions of the present invention can contain other conventional additives such as sulfide suppressants, e.g., nickel or iron components. Nickel oxide is a preferred sulfide suppressant, and if used, is present in an amount from about 1 to 25% by weight of the undercoat.

The catalyst washcoats of the present invention can be made by any suitable method. One preferred method includes preparing a mixture of at least one water-soluble or dispersible, platinum group metal component and a finely-divided, high surface area, refractory oxide which is sufficiently dry to absorb essentially all of the solution to form a supported platinum group metal component. If more than one platinum group metal component is used in the catalyst washcoat composition, the additional platinum group metal component(s), can be supported on the same or different refractory oxide particles as the first platinum group metal component.

The supported platinum group metal component or plurality of such supported platinum group metal components are then added to water along with other additives, and comminuted by a ball mill or other suitable equipment to form a slurry. Preferably, the slurry is acidic, having a pH of less than 7 and preferably from 3 to 7. The pH is preferably lowered by the addition of an acid, preferably acetic acid to the slurry. In preferred embodiments, the catalyst washcoat slurry is comminuted to result in substantially all of the solids having particle sizes of less than 10 or 15 micrometers in average diameter. At this point stabilizing components such as barium and strontium acetate, and promoting components including lanthanum acetate can be added and the composition is milled further. The catalyst washcoat slurry can be formed into a catalyst layer on a suitable carrier. The platinum group components and as well additives provided in soluble form, e.g., oxygen storage components, zirconium components and promoters, in the catalyst layer are converted to a water insoluble form chemically or by calcining. The catalyst layers are preferably calcined, preferably at temperatures of at least 250° C.

Alternatively, each layer (or segment) can also be prepared by the method disclosed in U.S. Pat. No. 4,134,860 (hereby incorporated by reference) generally recited as follows.

A finely-divided, high surface area, refractory oxide support is contacted with a solution of a water-soluble, platinum group metal component to provide a mixture which is essentially devoid of free or unabsorbed liquid. The platinum group metal component of the solid, finely-divided mixture can be converted at this point in the process into an essentially water-insoluble form while the mixture remains essentially free of unabsorbed liquid. This process can be accomplished by employing a refractory oxide support, e.g., alumina, including stabilized aluminas, which is sufficiently dry to absorb essentially all of the solution containing the platinum group metal component, i.e., the amounts of the solution and the support, as well as the moisture content of the latter, are such that their mixture has an essential absence of free or unabsorbed solution when the addition of the platinum group metal component is complete. During the latter conversion or fixing of the catalytically-promoting metal component on the support, the composite remains essentially dry, i.e., it has substantially no separate or free liquid phase.

The washcoat used to form the undercoat can be prepared, for example, by mixing a slurry of a finely divided high surface area refractory oxide support with a zirconium component. The zirconium supported refractory oxide is then milled for a suitable time to obtain 90% of the particles having a particle size of less than 20, preferably less than 10, more preferably 5 to 10 microns. The milled composition is then combined with nickel oxide. The undercoat composition can be combined as a slurry with a suitable vehicle, preferably water, in an amount from 20 to 60% solids and preferably 25 to 55% solids. Optionally a binder such as an alumina or silica binder can be added to the composition to improve the adherence of the washcoat to the internal surfaces of the substrate.

Washcoat compositions containing the hydrocarbon adsorbent material include a molecular sieve, preferably a zeolite and most preferably a Beta zeolite as recited above and a binder also referred to as a washcoat binder. Washcoat binders typical for use in the formulation of slurries suitable for the preparing the hydrocarbon trap slurry include but are not restricted to the following: sols of alumina, silica, ceria and zirconia; inorganic and organic salts and hydrolysis products thereof of aluminum, silicon, cerium and zirconium such as nitrates, nitrites, halides, sulfates and acetates; hydroxides of aluminum, silicon, cerium, zirconium, and mixtures of all of the above components. Also useful as binders are organic silicates which are hydrolyzable to silica include tetraethyl orthosilicates.

The relative proportions of zeolite and binder can range from about 1 to 20 percent by weight and preferably from about 5 to about 15 weight percent. A preferred composite comprises about 90 weight percent Beta Zeolite and about 10 weight percent of a silica sol. Preferably, the silica sol has substantially no alumina.

The amount of adsorbent components of the composition can be varied based on factors including the specific hydrocarbons to be adsorbed, the specific zeolite and binder combination and concentrations, the conditions of the exhaust stream containing the hydrocarbons and the like.

Typically, hydrocarbon trap segment composition is in an aqueous slurry form having 5 to 50, preferably 10 to 40 weight percent solids. The hydrocarbon trap segment composition is typically disposed on the interior wall of the substrate (or on the undercoat in certain embodiment) to a thickness of from 0.3 to 3.0 g/in$^3$ and preferably 0.5 to 2.5 g/in$^3$ of coating based on the amount of zeolite adsorber compound.

The washcoat used to form the NOx trap segment can be prepared, for example, by impregnating a slurry of a finely divided high surface area refractory oxide support with a platinum group metal precursor (e.g., platinum nitrate), alkali and/or alkaline earth metal components and a zirconium component. After drying and calcining, the dried composite is combined with the particulate oxygen storage component, e.g., ceria-zirconia composite material and ball milled to reduce the particle size as described above. The NOx trap composition can be combined as a slurry with a suitable vehicle, preferably water, in an amount from 20 to 60% solids.

The substrate (carrier) used in the invention is preferably a monolithic carrier of the type having a plurality of fine, parallel gas flow passages extending therethrough from an inlet or an outlet face of the carrier, so that the passages are open to fluid flow therethrough (also known as honeycomb carriers). The passages, which are essentially straight from their fluid inlet to their fluid outlet, are defined by the internal surfaces of the substrate (or walls). The flow passages of the monolithic carrier are thin-walled passages (or channels) which can be of any suitable cross-sectional shape and size, such as trapezoidal, rectangular, square, sinusoidal, hexagonal, oval or circular. Such structures can contain from about 60 to about 900 or more gas inlet openings ("cells") per square inch of cross section. Carriers can be of the ceramic type or of the metallic type.

Ceramic substrates (carriers) can be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. Metallic carriers can be made of a refractory metal such as a stainless steel or other suitable iron based corrosion resistant alloys.

Multi-zoned substrates are advantageously coated in an efficient procedure that reduces manufacturing time and costs. The process is preferably carried out using a metered charge coating device as described in U.S. Pat. No. 4,609,563; hereby incorporated by reference.

FIG. 11 is a schematic flow chart illustrating the various steps A through E in an embodiment of the present invention. Common elements in FIG. 11 and various other Figures have the same reference characters. The method of the present invention is useful for a continuous production.

In Step A (FIG. 11A), honeycombs (10) are continuously fed into an apparatus for coating. The honeycomb is retained by a suitable retaining means such as clamp (60). The honeycomb (10) may be weighed before coating. The honeycomb proceeds from Step A to Step B (FIG. 11B). In Step B honeycomb (10) is immersed in a vessel such a dip pan (62) having a region in the form of a reservoir (64) containing a coating media (66) (washcoat composition). A suitable means is used to apply a vacuum to the top or outlet axial end (14') of honeycomb (10). Preferably, hood (68) is sealingly applied to the top or outlet axial end (14') of honeycomb (10) and a vacuum is applied by a suitable vacuum means, such as a vacuum pump (not shown) through conduit 69 to the top end 14' of the honeycomb 10 to create a pressure drop and thereby draw the coating media 66 from the reservoir 64 into the bottom or inlet axial end 14 of the honeycomb 10 so as to coat the passages 16 at least over a portion of their length. This coating is conducted in the manner disclosed in U.S. Pat. No. 5,953,832, hereby incorporated by reference. To apply the coating for only part of the passage length, there is a limited amount of fluid (coating media) in the reservoir. When the fluid is all removed it coats a predetermined length and air is sucked into the passage. The front edge of the fluid which had filled the passages breaks and there is an open path from the inlet to the outlet. The composition forms a coating length on the internal surfaces of the substrate (or wall) up to the predetermined length. In Step B, the vacuum applied can be from 5 to 15 and typically 5 to 10 inches of water. The coating step takes place from 1 to 10 seconds and preferably 2 to 4 seconds.

The coating applied in Step B is then dried in accordance with Step C (FIG. 11C). A useful description of the drying step is described in the referenced U.S. Pat. No. 5,953,832. Step C is an operative engagement of the vacuum apparatus for pulling vapors through the substrate and a blowing device for forcing gas (e.g., heated air) through the substrate in order to dry the coating. The honeycomb 10 continues to be retained by a suitable retaining means such as clamp 60 during the drying operation. A suitable means is used to apply a vacuum to the top or outlet axial end 14' of honeycomb 10. Preferably, hood 68 can continue to be applied or a new hood 70 is sealingly applied to the top or outlet axial end 14' of honeycomb 10 and a vacuum is applied by a suitable vacuum means, such as a vacuum pump (not shown) through conduit 72 to the top end or outlet axial end 14' of the honeycomb 10. There is a means for forcing or pushing a gas (e.g., hot air) into the passages 16 of the honeycomb. The apparatus includes a hood 76 which has means to be sealingly applied to the bottom or inlet axial end 14 of honeycomb 10.

In the operation of Step C, a vacuum is generated by a suitable vacuum generating device to draw gas from the top or outlet axial end 14' through conduit 72. A blower (not shown) or suitable device is activated to force a hot gas into conduit 78 and into the bottom or inlet axial end 14 of honeycomb 10. Accordingly, vapors are drawn from the honeycomb 10 outlet 14' through hood 70 and out conduit 72, while hot air is forced upwardly through conduit 78 into the hood 76 and up into the bottom or inlet axial end 14 of honeycomb 10. As a consequence, vapors within the passages 16 of the honeycomb 10 are drawn out of the passages and hot gas is forced through the passages of honeycomb to dry the coating.

The intensity of the vacuum imposed during the drying step can vary depending upon the cross-sectional areas of the passages 16, the composition and thickness of the coating media applied to each channel. Generally, the intensity of the vacuum will be in the range of from about 5 to about 15 inches of water. A device for imposing a vacuum can be, for example, a Paxton Blower. The hot blowing gas system can be in the form of jet air kerosene heater having a heating capacity of, for example, about 50,000 BTU. In operation, once the substrate is removed from the reservoir of the coating media in Step B, the vacuum draws the vaporized constituents from the passages at a vacuum of from about 5 to 15 inches of water, for typically from 2 to 40 seconds, preferably 2 to 10 seconds, and most preferably 2 to 6 seconds. The vacuum is maintained until the vapors are dissipated. During or after imposition of the vacuum, the hot gas generating system can generate a hot gas (e.g., hot air) at a suitable temperature (e.g., from about 75° to 400° C., most typically from 75° to 200° C.) and at a suitable flow rate to hasten drying of the layer.

The coated and dried honeycomb from Step C next goes to Step D (FIG. 11D) where air at ambient temperature is applied from 2 to 20 seconds and preferably 5 to 20 seconds and preferably about 8 seconds in order to cool the coating as quickly as possible. This completes a coating step for a layer (or segment) in the present invention. The ambient air is typically at a temperature range of from 5° to 40° C. Other gases, preferably inert gases, can be used aside from air for the cooling step. Preferably, there is a hood such as hood 70 at the outlet 14'.

An outlet segment coating can be provided by rotating the honeycomb 10 in Step E (FIG. 11E) so that the outlet axial end 14' becomes the bottom end and the inlet axial end 14 becomes the top end to put coating through the outlet side. The process can be repeated to create the coating architectures of FIGS. 5-8 and 10 on the coated honeycomb.

Preferably the substrate is calcined after the completion of the coating and drying of both the inlet and outlet layers on the substrate. The calcining can be conducted at from 250° C. to 900° C. at from 0.1 to 10 hours and preferably from 450° C. to 750° C. at from 0.5 to 2 hours.

To prepare a substrate having a second catalytic layer according to the coating design of the second group of passages (e.g., see FIGS. 8A–C), additional processing steps are conducted. The outlet axial end of the coated and calcined substrate from above is coated with a volume of washcoat slurry containing precious metal component, support (e.g., activated alumina), and other components (e.g., oxygen storage components) to form a second catalytic layer. Here again, the volume of the coating slurry can be used to control the coating length of the second catalytic layer. Preferably, the coating length of the second layer is about 30–70% of the axial length of the substrate, more preferably about 40–60% of the axial length. After coating with the second catalytic layer, the substrate can be dried and calcined.

In embodiments of Catalyst A having the Design A1, the passages that contain the second catalytic coat (e.g., see FIGS. 8A–C) are preferably selectively coated by using a modified dip pan that holds the coating slurry in the metered charge coating device. For example, as shown in FIG. 12, the dip pan can have a circular insert with a central hole (42) so that when a slurry (43) is drawn up the substrate (10) the outer circumferential passages remain uncoated, while the central passages are coated. The dip pan can be provided with an adhesive surface (44) surrounding the central hole to prevent entry of the coating slurry (in the illustrated embodiment) in to the passages outside of the desired coating pattern. The inserts of the dip pan can be modified to provide any radial zone coating profile, such as an annulus or toroid. In another embodiment, although less desirable from the standpoint of time, the passages of each substrate that are to remain uncoated can be separately blanked off before being placed in the metered charge coating device.

The following examples further illustrate the present invention, but of course, should not be construed as in any way limiting its scope.

EXAMPLE 1

Preparation of An Axial Zone-Coated Catalyst Having the Coating Design A2 (With an Undercoat).

A. Undercoat Slurry

1. Slurry Preparation

Alumina powder having a surface area of about 150 square meters per gram ("$m^2/g$") was shear-mixed with distilled water and acetic acid (10% of the alumina weight). The slurry was continuously milled until a particle size of 90% of the particles having a diameter of 12 microns or less was attained. The slurry was shear-mixed and alumina binder having a surface area of about 320 $m^2/g$ was added in an amount to give a loading of 0.1 $g/in^3$ in the finished sample. 50% Nickel oxide slurry was added in an amount to give a loading of 0.3 $g/in^3$ in the finished sample. A few drops of octanol were added to the slurry.

2. Coating

The properties of the slurry obtained in step 1 above were adjusted for coating by adding distilled water to lower the concentration of solids and adding acetic acid to adjust the pH to about 3.5 to 4.5. Racetrack cordierite substrates measuring 3.15 inches short diameter by 4.75 inches long diameter and 6.00 inches in length were coated with the slurry to achieve a target undercoat loading of 1.3 $g/in^3$. The coated substrates were dried at 110° C. for 4 hours and calcined at 550° C. for 1 hour in air. The undercoat contained 1.0 $g/in^3$ of alumina, and 0.3 $g/in^3$ of NiO.

B. Hydrocarbon Trap Slurry

3. Slurry Preparation

Steam-treated Beta zeolite was shear-mixed with distilled water and acetic acid (5% of the zeolite weight). The slurry was continuously milled until a particle size of 90% of the particles having a diameter of 12 microns or less was achieved. The slurry was shear-mixed, and zirconium acetate solution was added in an amount to give a specified loading of 0.1 $g/in^3$ in the hydrocarbon trap segment layer of the finished sample. A few drops of octanol were added to the slurry.

4. Coating

The properties of the slurry obtained in step 3 above were adjusted for coating by adding distilled water to lower the concentration of solids and adding acetic acid to adjust the pH to about 3.5 to 4.5. The substrates from step 2 were coated with the slurry at the designated front end of the substrate to achieve (after drying and calcining) a target bottom coat front zone loading of 1.0 $g/in^3$ and a height of 2 inches from the inlet axial end of the substrate. The substrates were dried at 110° C. for 4 hours and calcined at 550° C. for 1 hour in air. The hydrocarbon trap segment contained 1.0 $g/in^3$ of washcoat containing 0.9 $g/in^3$ of Beta zeolite and 0.1 $g/in^3$ of $ZrO_2$.

C. NOx Trap Slurry

5. Deposition (Pt on $Al_2O_3$)

Alumina having a surface area of about 150 $m^2/g$ was impregnated with a solution of amine-solubilized platinum hydroxide to give in the bottom coat rear zone of the finished sample the specified platinum loading. The preparation was conducted by diluting the platinum containing solution with distilled water to provide sufficient solution to bring the batch of alumina powder to incipient wetness of the alumina. Using a planetary mixer, the alumina was impregnated by slowly dripping the diluted platinum solution from a separatory funnel onto the alumina in a mixing bowl, and mixing for approximately 10 to 15 minutes. The separatory funnel was rinsed with distilled water. Acetic acid equal to 5% of the weight of the alumina was diluted with an equal weight of distilled water and was dripped slowly from the separatory funnel onto the platinum impregnated alumina. The separatory funnel was rinsed with distilled water.

6. Slurry Preparation

The impregnated alumina obtained in step 5 above was shear-mixed with distilled water (some of which was reserved for use later in the preparation) and a few drops of octanol. A solution of zirconium acetate, potassium acetate, manganese nitrate, and barium hydroxide was added to the slurry in the amounts to attain in the finished bottom coat rear zone the specified loading of metal oxides. The resulting slurry was continuously milled until a particle size of 90% of the particles having a diameter of 12 microns or less was attained. A ceria-zirconia powder (containing 35% $CeO_2$, 7% $NdO_2$, 7% $PrO_2$ and 51% $ZrO_2$) was added to give a specified loading of 0.15 $g/in^3$ in the finished NOx trap segment of the sample. The reserved distilled water was added to the slurry. The slurry was continuously milled until a particle size of 90% of the particles having a diameter of 9 microns or less was achieved. The pH of the slurry was adjusted to about 3.5 to 4.5 with acetic acid.

7. Coating

The properties of the slurry obtained in step 6 above were adjusted for zone coating by adding distilled water to lower the concentration of solids and adding acetic acid to adjust the viscosity. The substrates from step 4 were coated with the slurry at the designated outlet axial end of the substrate to achieve (after drying and calcining) a target NOx trap segment loading of 1.2 $g/in^3$ and a height of 4 inches from the outlet axial end of the substrate. The substrates were dried at 110° C. for 4 hours, and calcined at 550° C. for 1 hour in air. The NOx trap segment contained 5.63 $g/ft^3$ of Pt, 0.5 $g/in^3$ of alumina, 0.1 $g/in^3$ of $ZrO_2$, 0.15 $g/in^3$ of ceria-zirconia composite, 0.15 $g/in^3$ of $K_2O$, 0.15 $g/in^3$ of $MnO_2$ and 0.15 $g/in^3$ of BaO.

D. First Inlet Catalytic Segment Slurry

8. Deposition (Pt and Rh on $Al_2O_3$)

Alumina having a surface area of about 150 $m^2/g$ was impregnated with a solution of amine-solubilized platinum hydroxide and rhodium nitrate to give in the first inlet catalytic segment of the finished sample the specified platinum and rhodium loading. The preparation was carried out by diluting a platinum-containing solution and a rhodium-containing solution with distilled water to provide sufficient solution to bring the batch of alumina powder to incipient wetness of the alumina. Using a planetary mixer, the alumina was impregnated by slowly dripping the diluted platinum solution from a separatory funnel onto the alumina in a mixing bowl and mixing for approximately 10 to 15 minutes. The separatory funnel was rinsed with distilled water. Acetic acid equal to 5% of the weight of the alumina was diluted with an equal weight of distilled water and was dripped slowly from the separatory funnel onto the platinum impregnated alumina. The diluted rhodium solution was dripped slowly onto the platinum impregnated alumina. The separatory funnel was rinsed with distilled water, and the impregnated powder was mixed for 20 minutes.

9. Slurry Preparation

The impregnated alumina obtained in step 8 above was shear-mixed with distilled water (some of which was reserved for use later in the preparation) and a few drops of octanol. Zirconium hydroxide was added to the slurry to give a specified loading of 0.075 $g/in^3$ in the first inlet catalytic segment of the sample. The resulting slurry was continuously milled until a particle size of 90% of the particles having a diameter of 12 microns or less was attained. A ceria-zirconia powder (containing 35% $CeO_2$, 7% $NdO_2$, 7% $PrO_2$ and 51% $ZrO_2$) was added to give a specified loading of 0.5 $g/in^3$ in the first inlet catalytic segment. The reserved distilled water was added to the slurry. The slurry was continuously milled until a particle size of 90% of the particles having a diameter of 9 microns or less was achieved. The pH of the slurry was adjusted to about 3.5 to 4.5 with acetic acid.

10. Coating

The properties of the slurry obtained in step 9 above were adjusted for zone coating by adding distilled water to lower the concentration of solids and adding acetic acid to adjust the viscosity. The coated substrates from step 7 were coated with the slurry at the designated inlet end of the substrate to achieve (after drying and calcining) a target first inlet catalytic segment loading of 1.0 $g/in^3$ and a height of 2 inches from the inlet axial end of the substrate. The substrates were dried at 10° C. for 4 hours and calcined at 550° C. for 1 hour in air. The first inlet catalytic segment contained 90 $g/ft^3$ of Pt, 16.9 $g/ft^3$ of Rh, 0.35 $g/in^3$ of alumina, 0.075 $g/in^3$ of $ZrO_2$ and 0.5 $g/in^3$ of ceria-zirconia composite.

E. First Outlet Catalytic Segment Slurry

11. Deposition (Pt and Rh on $Al_2O_3$)

Alumina having a surface area of about 150 square $m^2/g$ was impregnated with a solution of amine-solubilized platinum hydroxide and rhodium nitrate to give in the first outlet catalytic segment of the finished sample, the specified platinum and rhodium loading. The preparation was carried out by diluting the platinum- and rhodium-containing solutions with distilled water to provide sufficient solution to bring the batch of alumina powder to incipient wetness of the alumina. Using a planetary mixer, the alumina was impregnated by slowly dripping the diluted platinum solution from a separatory funnel onto the alumina in a mixing bowl and mixing for approximately 10 to 15 minutes. The separatory funnel was rinsed with distilled water. Acetic acid equal to 5% of the weight of the alumina was diluted with an equal weight of distilled water and was dripped slowly from the separatory funnel onto the platinum impregnated alumina. The diluted rhodium solution was dripped slowly onto the platinum impregnated alumina. The separatory funnel was rinsed with distilled water and the impregnated powder was mixed for 20 minutes.

12. Slurry Preparation

The impregnated alumina obtained in step 11 above was shear-mixed with distilled water (some of which was reserved for use later in the preparation) and a few drops of octanol. Zirconium hydroxide was added to the slurry to give a specified loading of 0.075 $g/in^3$ in the coated top coat rear zone sample. The resulting slurry was continuously milled until a particle size of 90% of the particles having a diameter of 12 microns or less was attained. A ceria-zirconia powder (containing 35% $CeO_2$, 7% $NdO_2$, 7% $PrO_2$ and 51% $ZrO_2$) was added to give a specified loading of 0.5 $g/in^3$ in the first outlet catalytic segment. The reserved distilled water was added to the slurry. The slurry was continuously milled until a particle size of 90% of the particles having a diameter of 9 microns or less was achieved. The pH of the slurry was adjusted to about 3.5 to 4.5 with acetic acid.

13. Coating

The properties of the slurry obtained in step 12 above were adjusted for zone coating by adding distilled water to lower the concentration of solids and adding acetic acid to adjust the viscosity. The coated substrates from step 10 were coated with the slurry at the designated outlet end of the substrate to achieve (after drying and calcining) a target first outlet catalytic segment loading of 0.9 $g/in^3$ and a height of 4 inches from the outlet axial end of the substrate. The substrates were dried at 110° C. for 4 hours and calcined at 550° C. for 1 hour in air. The outlet catalytic segment contained 5.63 g/ft³ of Pt, 8.44 g/ft³ of Rh, 0.35 g/in³ of alumina, 0.075 g/in³ of $ZrO_2$ and 0.5 g/in³ of ceria-zirconia composite.

F. Second Catalytic Layer

14. Deposition (Rh on $Al_2O_3$)

Alumina having a surface area of about 150 m²/g was impregnated with a solution of rhodium nitrate to give in the second catalytic layer of the finished sample the specified rhodium loading. The preparation was carried out by diluting the rhodium-containing solution with distilled water to provide sufficient solution to bring the batch of alumina powder to incipient wetness of the alumina. Using a planetary mixer, the alumina was impregnated by slowly dripping the diluted rhodium solution from a separatory funnel onto the alumina in a mixing bowl and mixing for approximately 10 to 15 minutes. The separatory funnel was rinsed with distilled water. Acetic acid equal to 5% of the weight of alumina was diluted with an equal weight of distilled water and was slowly dripped from the separatory funnel onto the rhodium-impregnated alumina. The separatory funnel was rinsed with distilled water.

15. Slurry Preparation

The impregnated alumina obtained in step 14 above was shear-mixed with distilled water (some of which was reserved for use later in the preparation) and a few drops of octanol. Zirconium hydroxide was added to the slurry to give a specified loading of 0.075 g/in³ in the second catalytic layer. The resulting slurry was continuously milled until a particle size of 90% of the particles having a diameter of 12 microns or less was attained. A ceria-zirconia powder (containing 35% $CeO_2$, 7% $NdO_2$, 7% $PrO_2$ and 51% $ZrO_2$) was added to give a specified loading of 0.5 g/in³ in the second catalytic layer. The reserved distilled water was added to the slurry. The slurry was continuously milled until a particle size of 90% of the particles having a diameter of 9 microns or less was achieved. The pH of the slurry was adjusted to about 3.5 to 4.5 with acetic acid.

16. Coating

The properties of the slurry obtained in step 15 above were adjusted for zone coating by adding distilled water to lower the concentration of solids and adding acetic acid to adjust the viscosity. The coated substrates from step 13 were coated with the slurry at the designated outlet end of the substrate to achieve (after drying and calcining) a target second catalytic layer loading of 0.9 g/in³ and a height of 2 inches from the outlet axial end of the substrate. The substrates were dried at 110° C. for 4 hours and calcined at 550° C. for 1 hour in air. The second catalytic layer contained 33.75 g/ft³ of Rh, 0.35 g/in³ of alumina, 0.075 g/in³ of $ZrO_2$ and 0.5 g/in³ of ceria-zirconia composite.

EXAMPLE 2

Preparation of An Axial Zone-Coated Catalyst Having the Coating Design A2 (With a Barrier Layer).

A. Hydrocarbon Trap Slurry

1. Slurry Preparation

Steam-treated Beta zeolite was shear-mixed with distilled water and acetic acid (5% of the zeolite weight). The slurry was continuously milled until a particle size of 90% of the particles having a diameter of 12 microns or less was achieved. The slurry was shear-mixed and zirconium acetate solution was added in an amount to give a specified loading of 0.1 g/in³ in the hydrocarbon trap segment layer of the finished sample. A few drops of octanol were added to the slurry.

2. Coating

The properties of the slurry obtained in step 1 above were adjusted for coating by adding distilled water to lower the concentration of solids and adding acetic acid to adjust the pH to about 3.5 to 4.5. Racetrack cordierite substrates measuring 3.15 inches short diameter by 4.75 inches long diameter and 6.00 inches in length were coated with the slurry at the inlet end of the substrate to achieve a target undercoat loading of 1.3 g/in³ and a height of 2 inches from the inlet axial end of the substrate. The coated substrates were dried at 110° C. for 4 hours and calcined at 550° C. for 1 hour in air. The hydrocarbon trap segment contained 1.0 g/in³ of washcoat containing 0.9 g/in³ of Beta zeolite and 0.1 g/in³ of $ZrO_2$.

B. NOx Trap Slurry

3. Deposition (Pt on $Al_2O_3$)

Alumina having a surface area of about 150 m²/g was impregnated with a solution of amine-solubized platinum hydroxide to give in the NOx trap segment of the finished sample the specified platinum loading. The preparation was carried out by diluting the platinum containing solution with distilled water to provide sufficient solution to bring the batch of alumina powder to incipient wetness of the alumina. Using a planetary mixer, the alumina was impregnated by slowly dripping the diluted platinum solution from a separatory funnel onto the alumina in a mixing bowl and mixing for approximately 10 to 15 minutes. The separatory funnel was rinsed with distilled water. Acetic acid equal to 5% of the weight of the alumina was diluted with an equal weight of distilled water and was dripped slowly from the separatory funnel onto the platinum impregnated alumina. The separatory funnel was rinsed with distilled water.

4. Slurry Preparation

The impregnated alumina obtained in step 3 above was shear-mixed with distilled water (some of which was reserved for use later in the preparation) and a few drops of octanol. A solution of zirconium acetate, potassium acetate, manganese nitrate, and barium hydroxide was added to the slurry in the amounts to attain in the finished bottom coat rear zone the specified loading of metal oxides. The resulting slurry was continuously milled until a particle size of 90% of the particles having a diameter of 12 microns or less was attained. A ceria-zirconia powder (containing 35% $CeO_2$, 7% $NdO_2$, 7% $PrO_2$ and 51% $ZrO_2$) was added to give a specified loading of 0.15 g/in³ in the finished NOx trap segment of the sample. The reserved distilled water was added to the slurry. The slurry was continuously milled until a particle size of 90% of the particles having a diameter of 9 microns or less was achieved. The pH of the slurry was adjusted to about 3.5 to 4.5 with acetic acid.

5. Coating

The properties of the slurry obtained in step 4 above were adjusted for zone coating by adding distilled water to lower the concentration of solids, and adding acetic acid to adjust the viscosity. The substrates from step 2 were coated with the slurry at the designated outlet axial end of the substrate to achieve (after drying and calcining) a target NOx trap segment loading of 1.2 g/in³ and a height of 4 inches from the outlet axial end of the substrate. The substrates were dried at 110° C. for 4 hours, and calcined at 550° C. for 1 hour in air. The NOx trap segment contained 5.63 g/ft³ of Pt.

0.5 g/in$^3$ of alumina, 0.1 g/in$^3$ of ZrO$_2$, 0.15 g/in$^3$ of ceria-zirconia composite, 0.15 g/in$^3$ of K$_2$O, 0.15 g/in$^3$ of MnO$_2$ and 0.15 g/in$^3$ of BaO.

C. Barrier Layer Slurry

6. Slurry Preparation

Alumina powder having a surface area of about 150 square meters per gram ("m$^2$/g") was shear-mixed with distilled water and acetic acid (10% of the alumina weight). The slurry was continuously milled until a particle size of 90% of the particles having a diameter of 12 microns or less was attained. The slurry was shear-mixed and alumina binder having s surface area of about 320 m$^2$/g was added in an amount to give a loading of 0.1 g/in$^3$ in the finished sample. 50% Nickel oxide slurry was added in an amount to give a loading of 0.3 g/in$^3$ in the finished sample. A few drops of octanol were added to the slurry.

7. Coating

The properties of the slurry obtained in step 6 above were adjusted for coating by adding distilled water to lower the concentration of solids and adding acetic acid to adjust the pH to about 3.5 to 4.5. The coated substrates from step 5 were coated with the slurry to achieve a target undercoat loading of 1.3 g/in$^3$. The coated substrates were dried at 110° C. for 4 hours and calcined at 550° C. for 1 hour in air. The undercoat contained 1.0 g/in$^3$ of alumina, and 0.3 g/in$^3$ of NiO.

D. First Inlet Catalytic Segment Slurry

8. Deposition (Pt and Rh on Al$_2$O$_3$)

Alumina having a surface area of about 150 m$^2$/g was impregnated with a solution of amine-solubilized platinum hydroxide and rhodium nitrate to give in the first inlet catalytic segment of the finished sample the specified platinum and rhodium loading. The preparation was carried out by diluting a platinum-containing solution and a rhodium-containing solution with distilled water to provide sufficient solution to bring the batch of alumina powder to incipient wetness of the alumina. Using a planetary mixer, the alumina was impregnated by slowly dripping the diluted platinum solution from a separatory funnel onto the alumina in a mixing bowl and mixing for approximately 10 to 15 minutes. The separatory funnel was rinsed with distilled water. Acetic acid equal to 5% of the weight of the alumina was diluted with an equal weight of distilled water and was dripped slowly from the separatory funnel onto the platinum impregnated alumina. The diluted rhodium solution was dripped slowly onto the platinum impregnated alumina. The separatory funnel was rinsed with distilled water, and the impregnated powder was mixed for 20 minutes.

9. Slurry Preparation

The impregnated alumina obtained in step 8 above was shear-mixed with distilled water (some of which was reserved for use later in the preparation) and a few drops of octanol. Zirconium hydroxide was added to the slurry to give a specified loading of 0.075 g/in$^3$ in the first inlet catalytic segment of the sample. The resulting slurry was continuously milled until a particle size of 90% of the particles having a diameter of 12 microns or less was attained. A ceria-zirconia powder (containing 35% CeO$_2$, 7% NdO$_2$, 7% PrO$_2$ and 51% ZrO$_2$) was added to give a specified loading of 0.5 g/in$^3$ in the first inlet catalytic segment. The reserved distilled water was added to the slurry. The slurry was continuously milled until a particle size of 90% of the particles having a diameter of 9 microns or less was achieved. The pH of the slurry was adjusted to about 3.5 to 4.5 with acetic acid.

10. Coating

The properties of the slurry obtained in step 9 above were adjusted for zone coating by adding distilled water to lower the concentration of solids and adding acetic acid to adjust the viscosity. The coated substrates from step 7 were coated with the slurry at the designated inlet end of the substrate to achieve (after drying and calcining) a target first inlet catalytic segment loading of 1.0 g/in$^3$ and a height of 2 inches from the inlet axial end of the substrate. The substrates were dried at 110° C. for 4 hours and calcined at 550° C. for 1 hour in air. The first inlet catalytic segment contained 90 g/ft$^3$ of Pt, 16.9 g/ft$^3$ of Rh, 0.35 g/in$^3$ of alumina, 0.075 g/in$^3$ of ZrO$_2$ and 0.5 g/in$^3$ of ceria-zirconia composite.

E. First Outlet Catalytic Segment Slurry

11. Deposition (Pt and Rh on Al$_2$O$_3$)

Alumina having a surface area of about 150 square m$^2$/g was impregnated with a solution of amine-solubilized platinum hydroxide and rhodium nitrate to give in the first outlet catalytic segment of the finished sample, the specified platinum and rhodium loading. The preparation was carried out by diluting the platinum- and rhodium-containing solutions with distilled water to provide sufficient solution to bring the batch of alumina powder to incipient wetness of the alumina. Using a planetary mixer, the alumina was impregnated by slowly dripping the diluted platinum solution from a separatory funnel onto the alumina in a mixing bowl and mixing for approximately 10 to 15 minutes. The separatory funnel was rinsed with distilled water. Acetic acid equal to 5% of the weight of the alumina was diluted with an equal weight of distilled water and was dripped slowly from the separatory funnel onto the platinum impregnated alumina. The diluted rhodium solution was dripped slowly onto the platinum impregnated alumina. The separatory funnel was rinsed with distilled water and the impregnated powder was mixed for 20 minutes.

12. Slurry Preparation

The impregnated alumina obtained-in step 11 above was shear-mixed with distilled water (some of which was reserved for use later in the preparation) and a few drops of octanol. Zirconium hydroxide was added to the slurry to give a specified loading of 0.075 g/in$^3$ in the coated top coat rear zone sample. The resulting slurry was continuously milled until a particle size of 90% of the particles having a diameter of 12 microns or less was attained. A ceria-zirconia powder (containing 35% CeO$_2$, 7% NdO$_2$, 7% PrO$_2$ and 51% ZrO$_2$) was added to give a specified loading of 0.5 g/in$^3$ in the first outlet catalytic segment. The reserved distilled water was added to the slurry. The slurry was continuously milled until a particle size of 90% of the particles having a diameter of 9 microns or less was achieved. The pH of the slurry was adjusted to about 3.5 to 4.5 with acetic acid.

13. Coating

The properties of the slurry obtained in step 12 above were adjusted for zone coating by adding distilled water to lower the concentration of solids and adding acetic acid to adjust the viscosity. The coated substrates from step 10 were coated with the slurry at the designated outlet end of the substrate to achieve (after drying and calcining) a target first outlet catalytic segment loading of 0.9 g/in$^3$ and a height of 4 inches from the outlet axial end of the substrate. The substrates were dried at 110° C. for 4 hours and calcined at 550° C. for 1 hour in air. The outlet catalytic segment contained 5.63 g/ft³ of Pt, 8.44 g/ft³ of Rh, 0.35 g/in³ of alumina, 0.075 g/in³ of ZrO₂ and 0.5 g/in³ of ceria-zirconia composite.

F. Second Catalytic Layer

14. Deposition (Rh on Al₂O₃)

Alumina having a surface area of about 150 m²/g was impregnated with a solution of rhodium nitrate to give in the second catalytic layer of the finished sample the specified rhodium loading. The preparation was carried out by diluting the rhodium-containing solution with distilled water to provide sufficient solution to bring the batch of alumina powder to incipient wetness of the alumina. Using a planetary mixer, the alumina was impregnated by slowly dripping the diluted rhodium solution from a separatory funnel onto the alumina in a mixing bowl and mixing for approximately 10 to 15 minutes. The separatory funnel was rinsed with distilled water. Acetic acid equal to 5% of the weight of alumina was diluted with an equal weight of distilled water and was slowly dripped from the separatory funnel onto the rhodium-impregnated alumina. The separatory funnel was rinsed with distilled water.

15. Slurry Preparation

The impregnated alumina obtained in step 14 above was shear-mixed with distilled water (some of which was reserved for use later in the preparation) and a few drops of octanol. Zirconium hydroxide was added to the slurry to give a specified loading of 0.075 g/in³ in the second catalytic layer. The resulting slurry was continuously milled until a particle size of 90% of the particles having a diameter of 12 microns or less was attained. A ceria-zirconia powder (containing 35% CeO₂, 7% NdO₂, 7% PrO₂ and 51% ZrO₂) was added to give a specified loading of 0.5 g/in³ in the second catalytic layer. The reserved distilled water was added to the slurry. The slurry was continuously milled until a particle size of 90% of the particles having a diameter of 9 microns or less was achieved. The pH of the slurry was adjusted to about 3.5 to 4.5 with acetic acid.

16. Coating

The properties of the slurry obtained in step 15 above were adjusted for zone coating by adding distilled water to lower the concentration of solids and adding acetic acid to adjust the viscosity. The coated substrates from step 13 were coated with the slurry at the designated outlet end of the substrate to achieve (after drying and calcining) a target second catalytic layer loading of 0.9 g/in³ and a height of 2 inches from the outlet axial end of the substrate. The substrates were dried at 110° C. for 4 hours and calcined at 550° C. for 1 hour in air. The second catalytic layer contained 33.75 g/ft³ of Rh, 0.35 g/in³ of alumina, 0.075 g/in³ of ZrO₂ and 0.5 g/in³ of ceria-zirconia composite.

What is claimed:

1. An exhaust gas treatment catalyst, comprising:
   a substrate comprising a longitudinal axis, an inlet end, an outlet end, having a length extending between the inlet end to the outlet end, a plurality of passages, wherein each of the passages is tubularly enclosed by an internal surface of the substrate;
   wherein the plurality of passages comprise a first group of passages and a second group of passages,
   wherein the internal surfaces of the first and second groups of passages have a trap layer and a first catalytic layer;
   wherein the second group of passages further has a second catalytic layer;

wherein:
   the trap layer comprises a hydrocarbon trap segment and a NOx trap segment,
      wherein the hydrocarbon trap segment comprises a hydrocarbon adsorbent; and
      wherein the NOx trap segment comprises a NOx adsorbent;
   the first catalytic layer comprises an inlet catalytic segment and an outlet catalytic segment;
      wherein the inlet catalytic segment comprises an inlet platinum component and an inlet rhodium component; and
      wherein the outlet catalytic segment comprises an outlet platinum component and an outlet rhodium component; and
   the second catalytic layer comprises a second platinum component;
   wherein:
   the trap layer is interposed between the internal surfaces of the substrate and the first catalytic layer; and
   the second catalytic layer is disposed on the first catalytic layer, and wherein the second catalytic layer begins from the outlet end and extends for no more than 50% of the substrate's length.

2. The exhaust gas treatment catalyst of claim 1, wherein the hydrocarbon trap segment begins from the inlet end, and extends part of the substrate's length; and
   wherein the NOx trap segment begins from the outlet end and extends for part of the substrate's length.

3. The exhaust gas treatment catalyst of claim 1, wherein the plurality of passages consist of no more than 60% of the second group of passages.

4. The exhaust gas treatment catalyst of claim 1, wherein the first group of passages are disposed in a toroidal pattern about the substrate's longitudinal axis.

5. The exhaust gas treatment catalyst of claim 1, wherein the hydrocarbon adsorbent comprises zeolite material.

6. The exhaust gas treatment catalyst of claim 1, wherein the NOx adsorbent comprises one or more alkaline earth metal components.

7. The exhaust gas treatment catalyst of claim 6, wherein the NOx trap segment further comprises a NOx trap platinum group metal component.

8. The exhaust gas treatment catalyst of claim 1, wherein the hydrocarbon trap segment abuts the NOx trap segment.

9. The exhaust gas treatment catalyst of claim 1, wherein the inlet catalytic segment abuts the outlet catalytic segment.

10. The exhaust gas treatment catalyst of claim 1, wherein the inlet catalytic segment comprises from about 12.5 to 200 g/ft³ of the inlet platinum component and about 2.5 to 25 g/ft³ of the inlet rhodium component.

11. The exhaust gas treatment catalyst of claim 1, wherein the outlet catalytic segment comprises from about 12.5 to 100 g/ft³ of the outlet platinum component and from about 2.5 to 25 g/ft³ of the outlet rhodium component.

12. The exhaust gas treatment catalyst of claim 1, wherein the second catalytic layer comprises from about 25 to 100 g/ft³ of the second platinum component.

13. The exhaust gas treatment catalyst of claim 1, wherein the second catalytic layer further comprises a second rhodium component.

14. The exhaust gas treatment catalyst of claim 13, wherein the second catalytic layer comprises from about 25 to 100 g/ft³ of the second-rhodium component.

15. The exhaust gas treatment catalyst of claim 1, wherein each of the inlet and outlet catalytic segments further comprise an oxygen storage component.

16. The exhaust gas treatment catalyst of claim 15, wherein the oxygen storage component is in the form of a diluted oxygen storage composition.

17. The exhaust gas treatment catalyst of claim 1, wherein the first and second group of passages further comprise an undercoat interposed between the trap layer and the internal surfaces of the substrate.

18. The exhaust gas treatment catalyst of claim 17, wherein the undercoat comprises a refractory inorganic oxide selected from alumina, zirconia, ceria and composites thereof.

19. The exhaust gas treatment catalyst of claim 1, wherein the first and second group of passages further comprise a barrier layer interposed between the first catalytic layer and the trap layer.

20. The exhaust gas treatment catalyst of claim 19, wherein the barrier layer comprises a refractory inorganic oxide selected from alumina, zirconia, ceria and composites thereof.

21. An exhaust gas treatment system, comprising an upstream catalyst and a downstream catalyst, wherein the downstream catalyst comprises:
a downstream substrate comprising a longitudinal axis, a downstream inlet end, a downstream outlet end, having a length extending between the inlet end to the outlet end, a plurality of downstream passages, wherein each of the downstream passages is tubularly enclosed by an internal surface of the downstream substrate;
wherein the plurality of downstream passages comprise a first group of downstream passages and a second group of downstream passages,
wherein the internal surfaces of the first and second groups of downstream passages have a downstream trap layer and a downstream first catalytic layer; and
wherein the second group of downstream passages further has a downstream second catalytic layer;
wherein:
the downstream trap layer comprises a hydrocarbon trap segment and a NOx trap segment,
wherein the hydrocarbon trap segment comprises a hydrocarbon adsorbent; and
wherein the NOx trap segment comprises a NOx adsorbent;
the first downstream catalytic layer comprises a downstream inlet catalytic segment and a downstream outlet catalytic segment;
wherein the downstream inlet catalytic segment comprises a downstream inlet platinum component and a downstream inlet rhodium component; and
wherein the downstream outlet catalytic segment comprises a downstream outlet platinum component and a downstream outlet rhodium component; and
the downstream second catalytic layer comprises a downstream second platinum component;
wherein:
the downstream trap layer is interposed between the internal surfaces of the downstream substrate and the downstream first catalytic layer; and
the downstream second catalytic layer is disposed on the downstream first catalytic layer, and wherein the downstream second catalytic layer begins from the outlet end and extends for no more than 50% of the downstream substrate's length.

22. The exhaust gas treatment catalyst of claim 21, wherein the hydrocarbon trap segment begins from the inlet end, and extends part of the substrate's length; and wherein the NOx trap segment begins from the outlet end and extends for part of the substrate's length.

23. The exhaust gas treatment system of claim 21, wherein the plurality of downstream passages consist of no more than 60% of the second group of downstream passages.

24. The exhaust gas treatment system of claim 21, wherein the first group of downstream passages are disposed in a toroidal pattern about the substrate's longitudinal axis.

25. The exhaust gas treatment system of claim 21, wherein the hydrocarbon adsorbent comprises zeolite material.

26. The exhaust gas treatment system of claim 21, wherein the NOx adsorbent comprises one or more alkaline earth metal components.

27. The exhaust gas treatment system of claim 26, wherein the NOx trap segment further comprises a NOx trap platinum group metal component.

28. The exhaust gas treatment system of claim 21, wherein the hydrocarbon trap segment abuts the NOx trap segment.

29. The exhaust gas treatment system of claim 21, wherein the downstream inlet catalytic segment abuts the outlet catalytic segment.

30. The exhaust gas treatment system of claim 21, wherein the downstream inlet catalytic segment comprises from about 12.5 to 200 g/ft$^3$ of the downstream inlet platinum component and about 2.5 to 25 g/ft$^3$ of the downstream inlet rhodium component.

31. The exhaust gas treatment system of claim 21, wherein the downstream outlet catalytic segment comprises from about 12.5 to 100 g/ft$^3$ of the downstream outlet platinum component and from about 2.5 to 25 g/ft$^3$ of the downstream outlet rhodium component.

32. The exhaust gas treatment system of claim 21, wherein the downstream second catalytic layer comprises from about 25 to 100 g/ft$^3$ of the second platinum component.

33. The exhaust gas treatment system of claim 21, wherein each of the downstream inlet and outlet catalytic segments further comprise an oxygen storage component.

34. The exhaust gas treatment system of claim 33, wherein the oxygen storage component is in the form of a diluted oxygen storage composition.

35. The exhaust gas treatment system of claim 21, wherein the downstream first and second group of passages further comprise a downstream undercoat interposed between the trap layer and the internal surfaces of the substrate.

36. The exhaust gas treatment system of claim 35, wherein the downstream undercoat comprises a refractory inorganic oxide selected from alumina, zirconia, ceria and composites thereof.

37. The exhaust gas treatment system of claim 21, wherein the downstream first and second group of passages further comprise a downstream barrier layer interposed between the first catalytic layer and the trap layer.

38. The exhaust gas treatment catalyst of claim 37, wherein the downstream barrier layer comprises a refractory inorganic oxide selected from alumina, zirconia, ceria and composites thereof.

39. The exhaust gas treatment system of claim 21, wherein the upstream catalyst comprises:
an upstream substrate comprising an upstream longitudinal axis, an upstream inlet end, an upstream outlet end, having a length extending between the upstream inlet end to the upstream outlet end, a plurality of upstream passages, wherein each of the upstream passages is tubularly enclosed by an internal surface of the upstream substrate;

wherein the internal surfaces of the upstream substrate have an upstream first catalytic layer, and an upstream second catalytic layer; and wherein the upstream first catalytic layer comprises an upstream first inlet catalytic segment and an upstream first outlet catalytic segment;

wherein:
the upstream first inlet catalytic segment comprises an upstream first inlet palladium component;
the upstream first outlet catalytic segment comprises an upstream first outlet platinum component and an upstream first outlet rhodium component; and
the upstream second catalytic layer comprises an upstream second palladium component;

wherein:
the upstream first catalytic layer is interposed between the internal surfaces of the upstream substrate and the upstream second catalytic layer; and
the upstream second catalytic layer is disposed on the upstream first catalytic layer, wherein the upstream second catalytic layer begins from the upstream inlet end and extends for no more than 50% of the upstream substrate's length.

40. The exhaust gas treatment system of claim 39, wherein:
the upstream first inlet catalytic segment begins from the upstream inlet end and extends part of the upstream substrate's length; and
the upstream first outlet catalytic segment begins from the upstream outlet end and extends part of the upstream substrate's length, the upstream first outlet catalytic segment at least partially overlying the upstream first inlet catalytic segment.

41. The exhaust gas treatment system of claim 40 wherein the upstream first inlet and upstream first outlet catalytic segment each extend to a length of at least 60% of the upstream substrate's axial length.

42. The exhaust gas treatment system of claim 39, wherein the upstream first inlet catalytic segment comprises from about 30 to about 520 g/ft$^3$ of the upstream first inlet palladium component.

43. The exhaust gas treatment system of claim 42, wherein the upstream first inlet catalytic segment further comprises from about 2 to about 112 g/ft$^3$ of an upstream first inlet platinum component.

44. The exhaust gas treatment system of claim 39, wherein the upstream first outlet catalytic segment comprises:
from about 2 g/in$^3$ to about 260 g/ft$^3$ of the upstream first outlet platinum component; and
from about 2 g/ft$^3$ to about 52 g/ft$^3$ of the upstream first outlet rhodium component.

45. The exhaust gas treatment system of claim 39, wherein the upstream second catalytic segment comprises from about 50 g/ft$^3$ to about 350 g/ft$^3$ of the upstream second palladium component.

46. The exhaust gas treatment system of claim 39, wherein the upstream first inlet catalytic segment and upstream first outlet catalytic segment each further comprise a diluted oxygen storage composition.

47. The exhaust gas treatment system of claim 39, further comprising an upstream undercoat interposed between the upstream first catalytic layer and the internal surfaces of the upstream substrate.

48. The exhaust gas treatment system of claim 47, wherein the upstream undercoat comprises a refractory inorganic oxide selected from alumina, zirconia, ceria and composites thereof.

49. An exhaust gas treatment catalyst, comprising:
a substrate comprising a longitudinal axis, an inlet end, an outlet end, having a length extending between the inlet end to the outlet end, a plurality of passages, wherein each of the passages is tubularly enclosed by an internal surface of the substrate;
wherein the internal surfaces of the substrate have a trap layer, a first catalytic layer, and a second catalytic layer;

wherein:
the trap layer comprises a hydrocarbon trap segment and a NOx trap segment,
wherein the hydrocarbon trap segment comprises a hydrocarbon adsorbent; and
wherein the NOx trap segment comprises a NOx adsorbent;
the first catalytic layer comprises an inlet catalytic segment and an outlet catalytic segment;
wherein the inlet catalytic segment comprises an inlet platinum component and an inlet rhodium component; and
wherein the outlet catalytic segment comprises an outlet platinum component and an outlet rhodium component; and
the second catalytic layer comprises a second platinum component;

wherein:
the trap layer is interposed between the internal surfaces of the substrate and the first catalytic layer; and
the second catalytic layer is disposed on the first catalytic layer, and wherein the second catalytic layer begins from the outlet end and extends for no more than 50% of the substrate's length.

50. The exhaust gas treatment catalyst of claim 49, wherein the hydrocarbon trap segment begins from the inlet end, and extends part of the substrate's length; and
wherein the NOx trap segment begins from the outlet end and extends for part of the substrate's length.

51. The exhaust gas treatment catalyst of claim 49, wherein the hydrocarbon adsorbent comprises zeolite material.

52. The exhaust gas treatment catalyst of claim 49, wherein the NOx adsorbent comprises one or more alkaline earth metal components.

53. The exhaust gas treatment catalyst of claim 52, wherein the NOx trap segment further comprises a NOx trap platinum group metal component.

54. The exhaust gas treatment catalyst of claim 49, wherein the hydrocarbon trap segment abuts the NOx trap segment.

55. The exhaust gas treatment catalyst of claim 49, wherein the inlet catalytic segment abuts the outlet catalytic segment.

56. The exhaust gas treatment catalyst of claim 49, wherein the inlet catalytic segment comprises from about 12.5 to 200 g/ft$^3$ of the inlet platinum component and about 2.5 to 25 g/ft$^3$ of the inlet rhodium component.

57. The exhaust gas treatment catalyst of claim 49, wherein the outlet catalytic segment comprises from about 12.5 to 100 g/ft$^3$ of the outlet platinum component and from about 2.5 to 25 g/ft$^3$ of the outlet rhodium component.

58. The exhaust gas treatment catalyst of claim 49, wherein the second catalytic layer comprises from about 25 to 100 g/ft$^3$ of the second platinum component.

59. The exhaust gas treatment catalyst of claim 49, wherein each of the inlet and outlet catalytic segments further comprise an oxygen storage component.

60. The exhaust gas treatment catalyst of claim 59, wherein the oxygen storage component is in the form of a diluted oxygen storage composition.

61. The exhaust gas treatment catalyst of claim 49, wherein the first and second group of passages further comprise an undercoat interposed between the trap layer and the internal surfaces of the substrate.

62. The exhaust gas treatment catalyst of claim 61, wherein the undercoat comprises a refractory inorganic oxide selected from alumina, zirconia, ceria and composites thereof.

63. The exhaust gas treatment catalyst of claim 49, wherein the first and second group of passages further comprise a barrier layer interposed between the first catalytic layer and the trap layer.

64. The exhaust gas treatment catalyst of claim 63, wherein the barrier layer comprises a refractory inorganic oxide selected from alumina, zirconia, ceria and composites thereof.

65. An exhaust gas treatment system, comprising a downstream catalyst, comprising:
a downstream substrate comprising a longitudinal axis, a downstream inlet end, a downstream outlet end, having a length extending between the downstream inlet end to the downstream outlet end, a plurality of passages, wherein each of the passages is tubularly enclosed by an internal surface of the downstream substrate;
wherein each of the internal surfaces of the downstream substrate has a downstream trap layer, a downstream first catalytic layer and a downstream second catalytic layer;
wherein:
the downstream trap layer comprises a hydrocarbon trap segment and a NOx trap segment,
wherein the hydrocarbon trap segment comprises a hydrocarbon adsorbent; and
wherein the NOx trap segment comprises a NOx adsorbent;
the downstream first catalytic layer comprises a downstream inlet catalytic segment and a downstream outlet catalytic segment;
wherein the downstream inlet catalytic segment comprises a downstream inlet platinum component and a downstream inlet rhodium component; and
wherein the downstream outlet catalytic segment comprises a downstream outlet platinum component and a downstream outlet rhodium component; and
the downstream second catalytic layer comprises a downstream second platinum component;
wherein:
the trap layer is interposed between the internal surfaces of the downstream substrate and the downstream first catalytic layer; and
the downstream second catalytic layer is disposed on the downstream first catalytic layer, and wherein the downstream second catalytic layer begins from the downstream outlet end and extends for no more than 50% of the downstream substrate's length.

66. The exhaust gas treatment system of claim 65, wherein the hydrocarbon trap segment begins from the downstream inlet end, and extends part of the downstream substrate's length; and wherein the NOx trap segment begins from the downstream outlet end and extends for part of the downstream substrate's length.

67. The exhaust gas treatment system of claim 65, wherein the hydrocarbon adsorbent comprises zeolite material.

68. The exhaust gas treatment system of claim 65, wherein the NOx adsorbent comprises one or more alkaline earth metal components.

69. The exhaust gas treatment system of claim 68, wherein the NOx trap segment further comprises a NOx trap platinum group metal component.

70. The exhaust gas treatment system of claim 65, wherein the hydrocarbon trap segment abuts the NOx trap segment.

71. The exhaust gas treatment system of claim 65, wherein the downstream inlet catalytic segment abuts the downstream outlet catalytic segment.

72. The exhaust gas treatment system of claim 65, wherein the downstream inlet catalytic segment comprises from about 12.5 to 100 g/ft$^3$ of the downstream inlet platinum component and about 2.5 to 25 g/ft$^3$ of the downstream inlet rhodium component.

73. The exhaust gas treatment system of claim 65, wherein the downstream outlet catalytic segment comprises from about 12.5 to 100 g/ft$^3$ of the downstream outlet platinum component and from about 2.5 to 25 g/ft$^3$ of the downstream outlet rhodium component.

74. The exhaust gas treatment system of claim 65, wherein the downstream second catalytic layer comprises from about 25 to 100 g/ft$^3$ of the downstream second platinum component.

75. The exhaust gas treatment system of claim 65, wherein the downstream second catalytic layer further comprises a downstream second rhodium component.

76. The exhaust gas treatment system of claim 75, wherein the downstream second catalytic layer comprises from about 25 to 100 g/ft$^3$ of the downstream second rhodium component.

77. The exhaust gas treatment system of claim 65, wherein each of the downstream inlet and outlet catalytic segments further comprise an oxygen storage component.

78. The exhaust gas treatment system of claim 77, wherein the oxygen storage component is in the form of a diluted oxygen storage composition.

79. The exhaust gas treatment system of claim 65, wherein the downstream first and second group of passages further comprise a downstream undercoat interposed between the downstream trap layer and the internal surfaces of the downstream substrate.

80. The exhaust gas treatment system of claim 79, wherein the downstream undercoat comprises a refractory inorganic oxide selected from alumina, zirconia, ceria and composites thereof.

81. The exhaust gas treatment system of claim 65, wherein the downstream first and second group of passages further comprise a downstream barrier layer interposed between the downstream first catalytic layer and the downstream trap layer.

82. The exhaust gas treatment system of claim 81, wherein the downstream barrier layer comprises a refractory inorganic oxide selected from alumina, zirconia, ceria and composites thereof.

83. The exhaust gas treatment system of claim 65, further comprising an upstream catalyst, wherein the upstream catalyst comprises:
an upstream substrate comprising an upstream longitudinal axis, an upstream inlet end, an upstream outlet end, having a length extending between the upstream inlet end to the upstream outlet end, a plurality of upstream passages, wherein each of the upstream passages is tubularly enclosed by an internal surface of the upstream substrate;

wherein the internal surfaces of the upstream substrate have an upstream first catalytic layer, and an upstream second catalytic layer; and wherein the upstream first catalytic layer comprises an upstream first inlet catalytic segment and an upstream first outlet catalytic segment;

wherein:
the upstream first inlet catalytic segment comprises an upstream first inlet palladium component;
the upstream first outlet catalytic segment comprises an upstream first outlet platinum component and an upstream first outlet rhodium component;

wherein:
the upstream first catalytic layer is interposed between the internal surfaces of the upstream substrate and the upstream second catalytic layer; and
the upstream second catalytic layer is disposed on the upstream first catalytic layer, wherein the upstream second catalytic layer begins from the upstream inlet end and extends for no more than 50% of the upstream substrate's length.

84. The exhaust gas treatment system of claim 83, wherein:
the upstream first inlet catalytic segment begins from the upstream inlet end and extends part of the upstream substrate's length; and
the upstream first outlet catalytic segment begins from the upstream outlet end and extends part of the upstream substrate's length, the upstream first outlet catalytic segment at least partially overlying the upstream first inlet catalytic segment.

85. The exhaust gas treatment system of claim 84 wherein the upstream first inlet and upstream first outlet catalytic segments each extend to a length of at least 60% of the upstream substrate's axial length.

86. The exhaust gas treatment system of claim 83 wherein the upstream first inlet catalytic segment comprises from about 30 to about 520 g/ft$^3$ of the upstream first inlet palladium component.

87. The exhaust gas treatment system of claim 86, wherein the upstream first inlet catalytic segment further comprises from about 2 to about 112 g/ft$^3$ of an upstream first inlet platinum component.

88. The exhaust gas treatment system of claim 83, wherein the upstream first outlet catalytic segment comprises:
from about 2 g/in$^3$ to about 260 g/ft$^3$ of the upstream first outlet platinum component; and
from about 2 g/ft$^3$ to about 52 g/ft$^3$ of the upstream first outlet rhodium component.

89. The exhaust gas treatment system of claim 83, wherein the upstream second catalytic segment comprises from about 50 g/ft$^3$ to about 350 g/ft$^3$ of the upstream second palladium component.

90. The exhaust gas treatment system of claim 83, wherein the upstream first inlet catalytic segment and upstream first outlet catalytic segment each further comprise a diluted oxygen storage composition.

91. The exhaust gas treatment catalyst of claim 83, further comprising an upstream undercoat interposed between the upstream first catalytic layer and the internal surfaces of the upstream substrate.

92. The exhaust gas treatment catalyst of claim 91, wherein the upstream undercoat comprises a refractory inorganic oxide selected from alumina, zirconia, ceria and composites thereof.

* * * * *